Figure 2A:
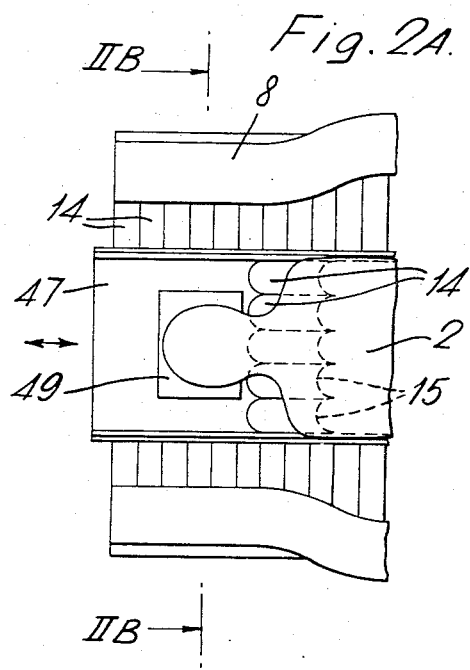

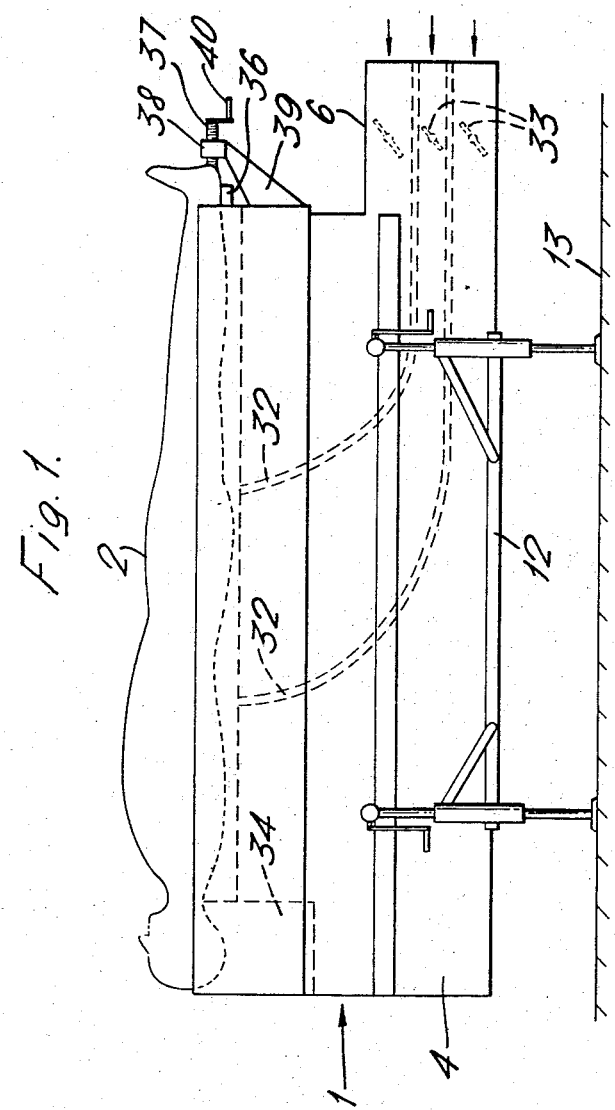

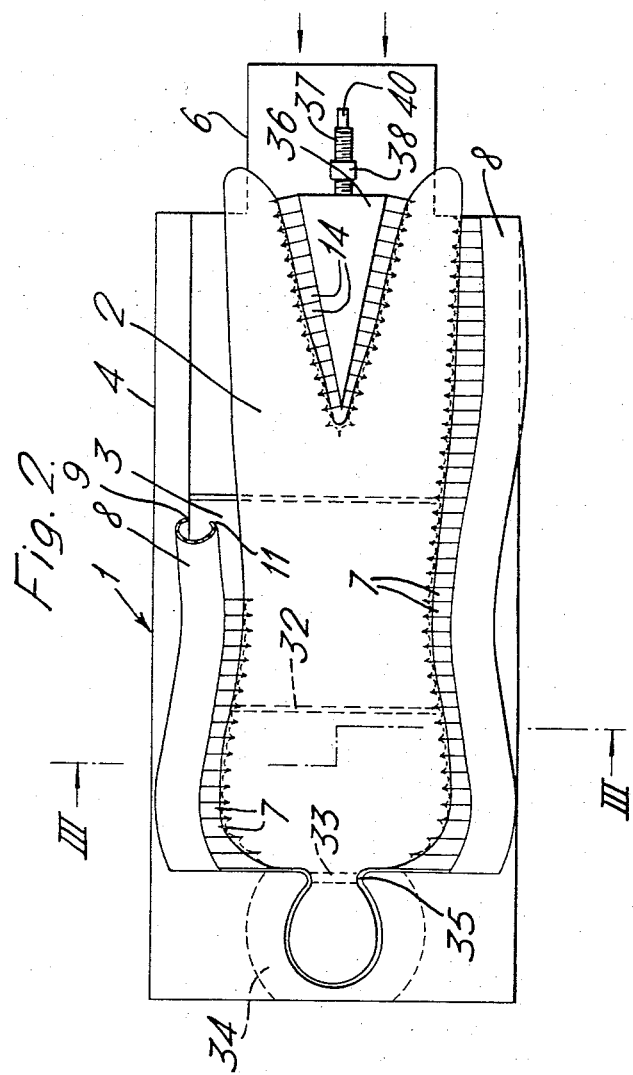

Sept. 12, 1967  L. A. HOPKINS  3,340,551
APPARATUS FOR SUPPORTING A BODY ON A GASEOUS CUSHION
Filed April 26, 1966  27 Sheets-Sheet 3

INVENTOR
L. A. HOPKINS
BY
Cameron, Kerkam & Sutton
ATTORNEYS

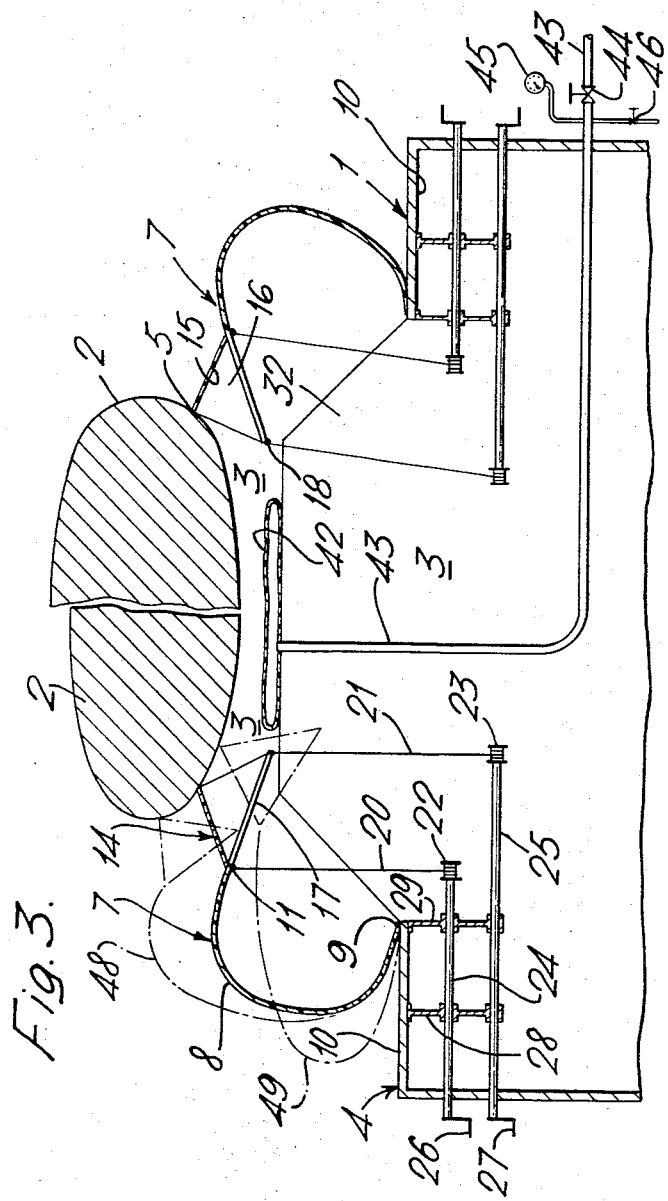

Sept. 12, 1967  L. A. HOPKINS  3,340,551
APPARATUS FOR SUPPORTING A BODY ON A GASEOUS CUSHION
Filed April 26, 1966  27 Sheets-Sheet 5
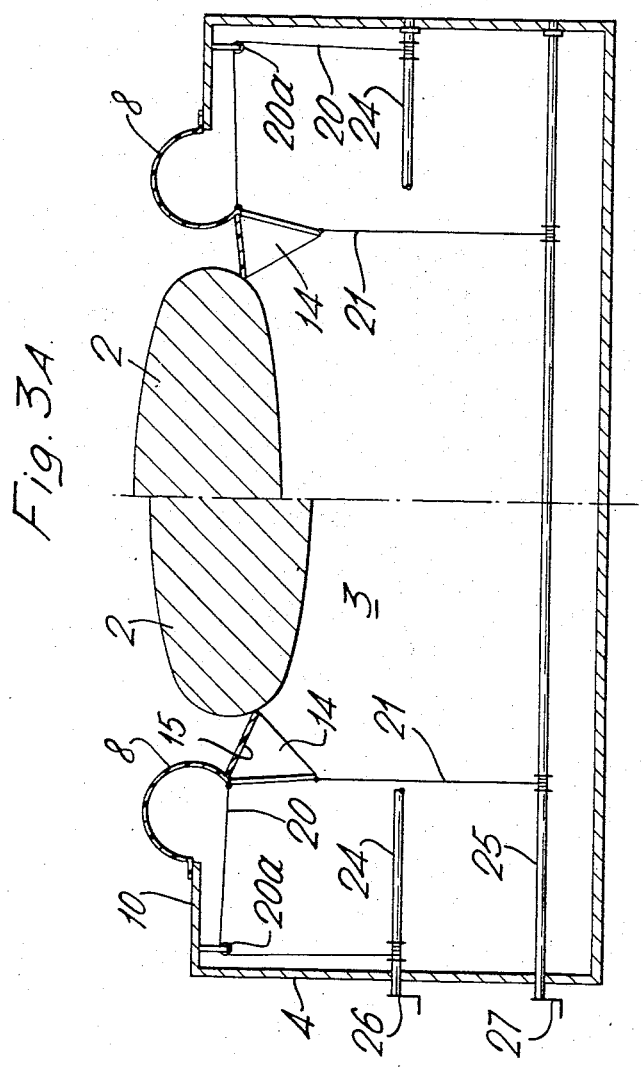
INVENTOR
L. A. HOPKINS
BY
Cameron, Kerkam & Sutton
ATTORNEYS

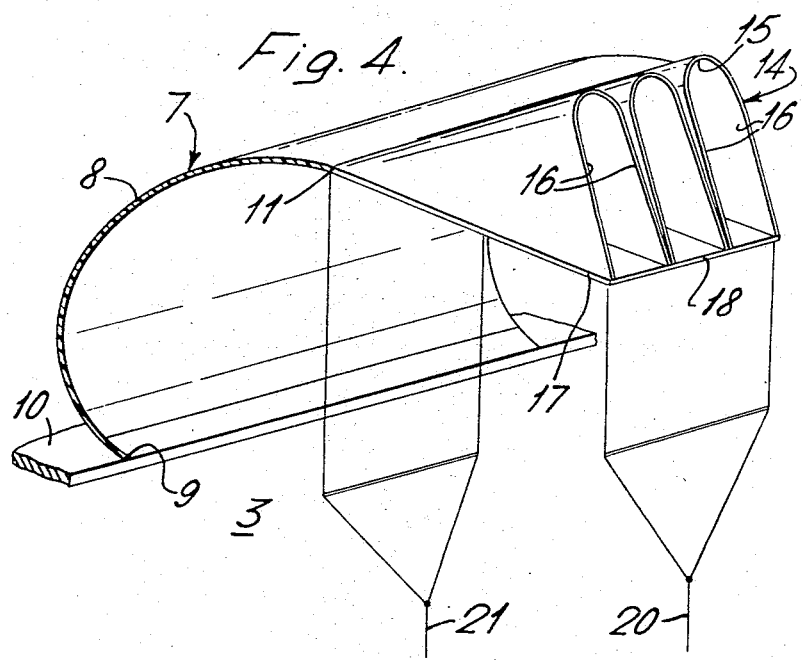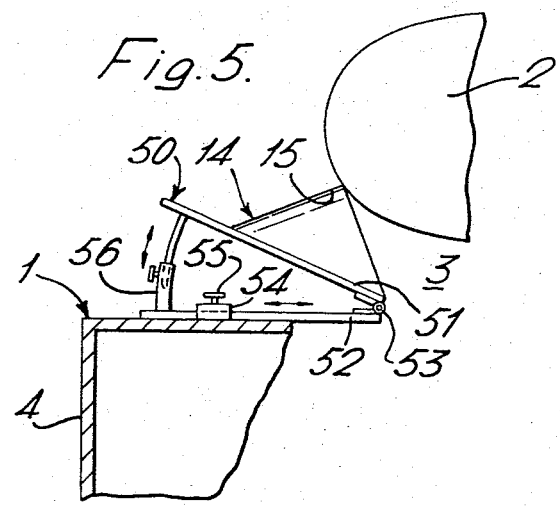

Sept. 12, 1967 L. A. HOPKINS 3,340,551
APPARATUS FOR SUPPORTING A BODY ON A GASEOUS CUSHION
Filed April 26, 1966 27 Sheets-Sheet 7
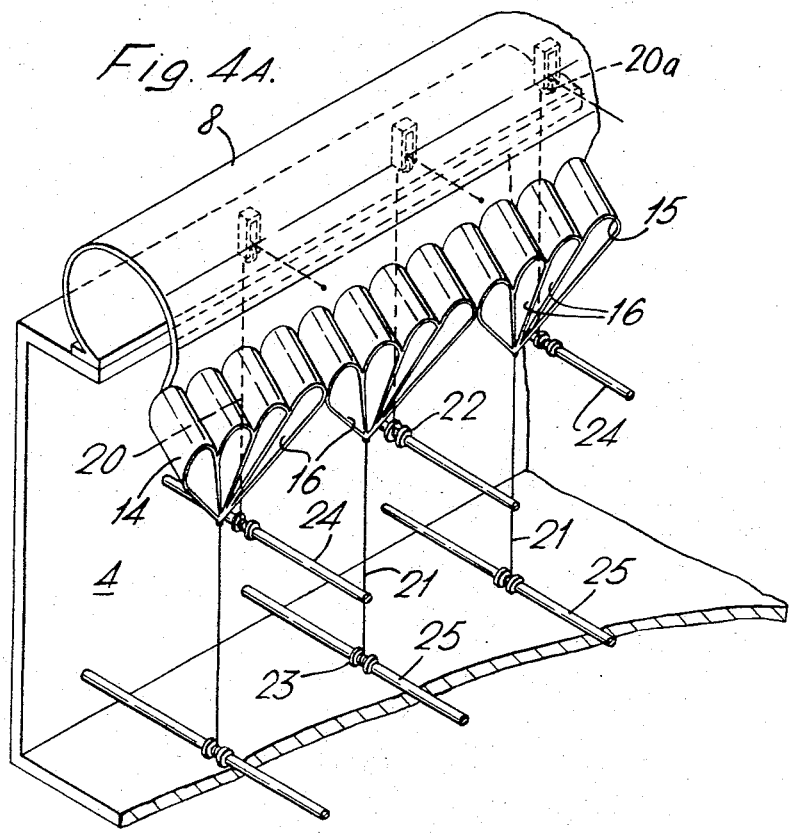
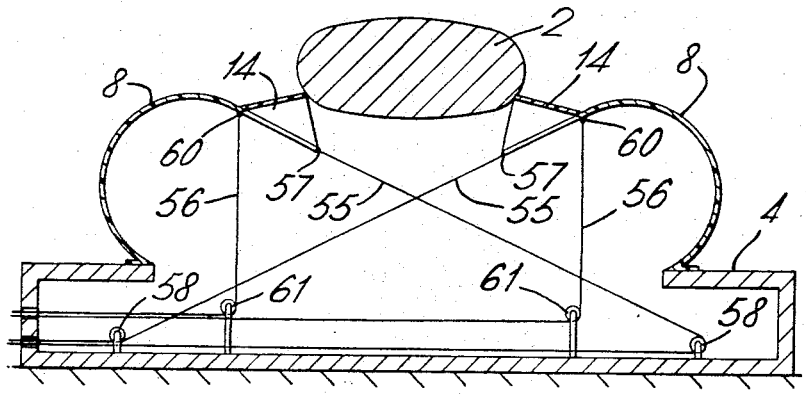
INVENTOR
L. A. HOPKINS
BY
Cameron, Kerkam & Sutton
ATTORNEYS

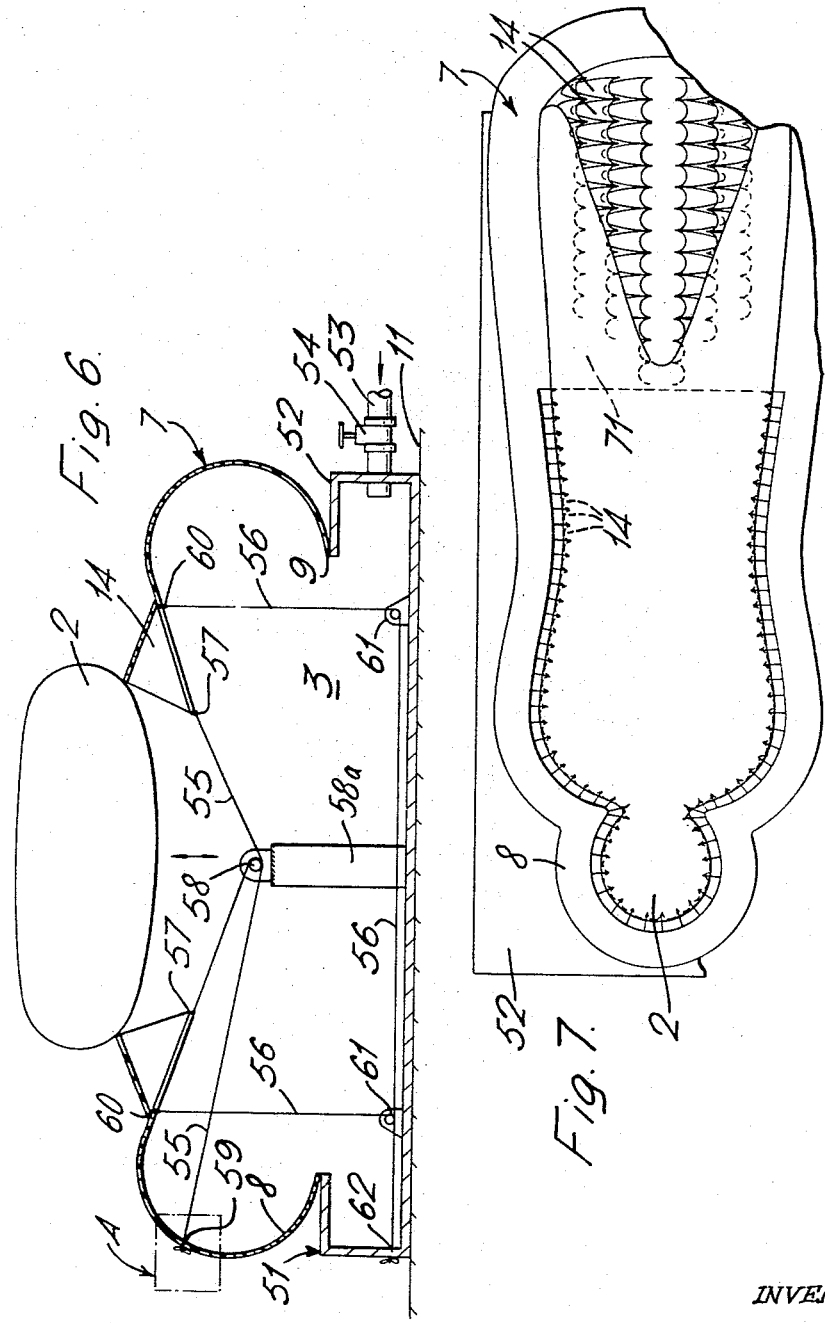

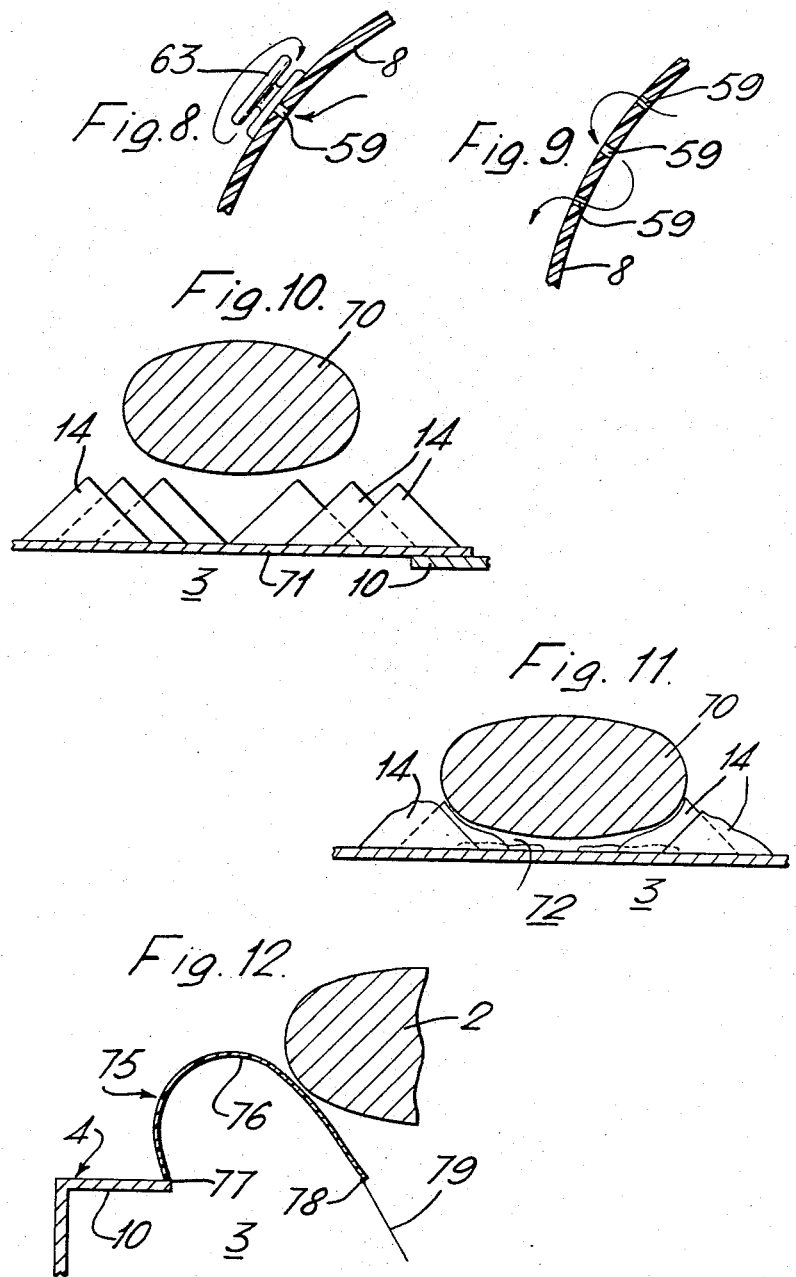

Sept. 12, 1967   L. A. HOPKINS   3,340,551
APPARATUS FOR SUPPORTING A BODY ON A GASEOUS CUSHION
Filed April 26, 1966   27 Sheets-Sheet 10
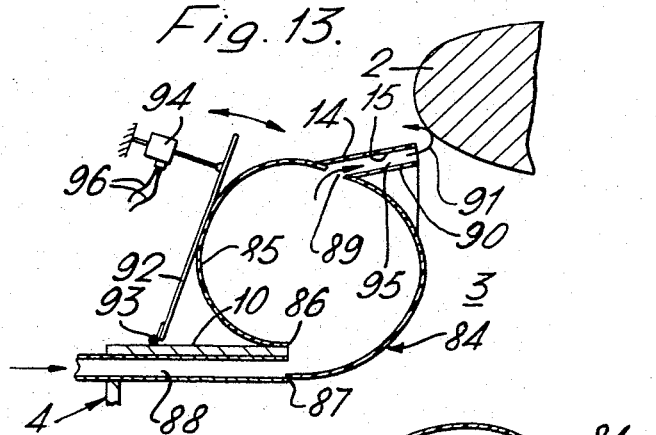
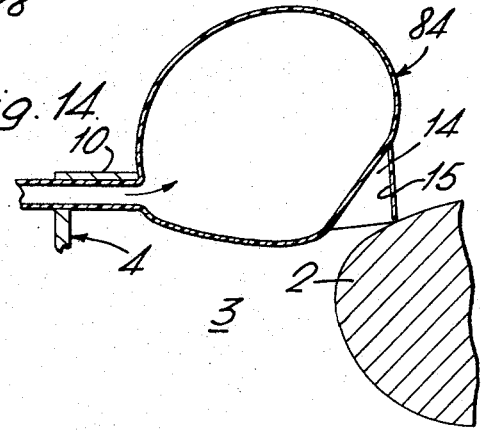
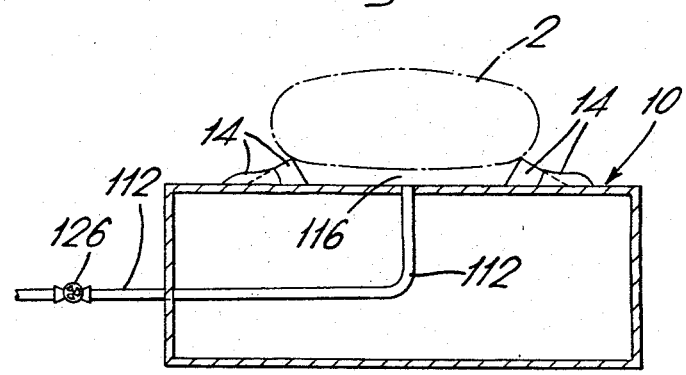
INVENTOR
L. A. HOPKINS
BY
Cameron, Kerkam & Sutton
ATTORNEYS

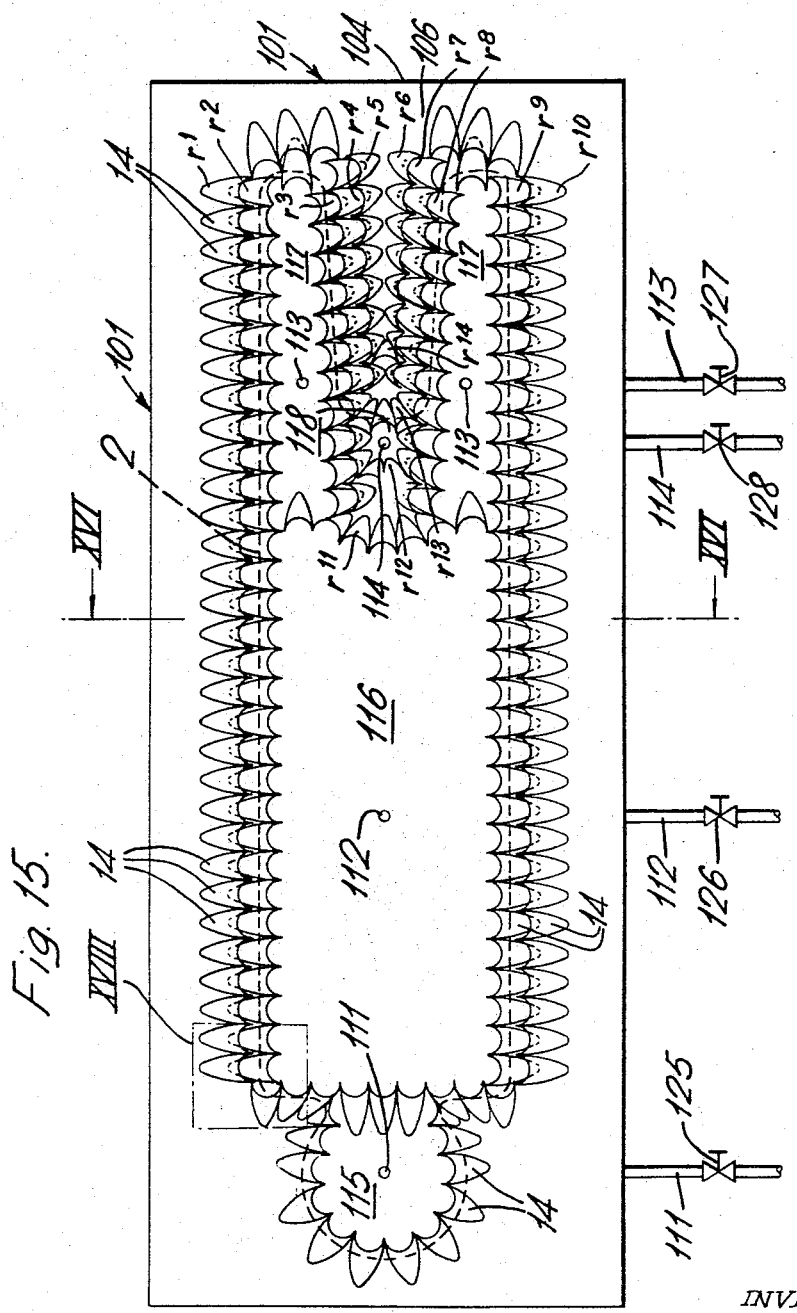

Sept. 12, 1967

L. A. HOPKINS 3,340,551

APPARATUS FOR SUPPORTING A BODY ON A GASEOUS CUSHION

Filed April 26, 1966

27 Sheets-Sheet 13

*INVENTOR*
L. A. HOPKINS
BY
Cameron, Kerkam & Sutton
*ATTORNEYS*

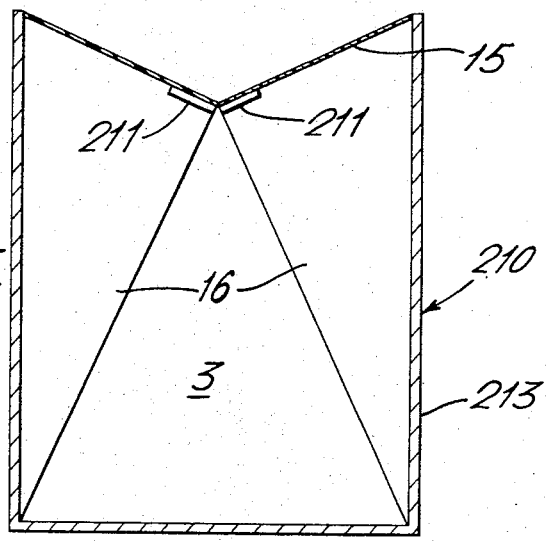
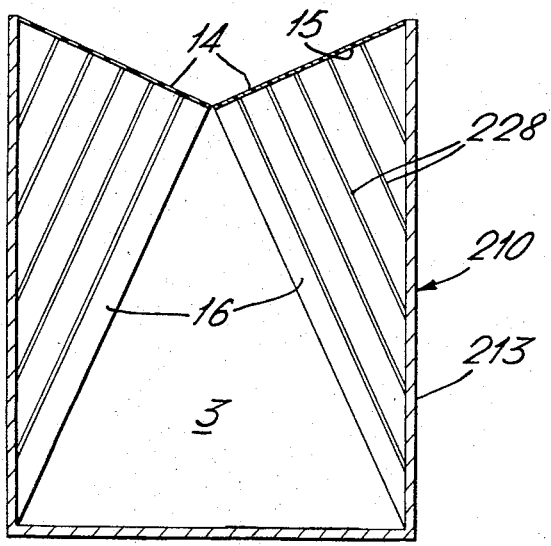

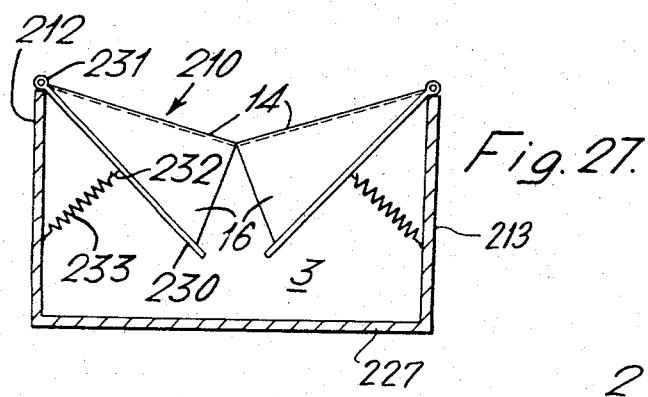
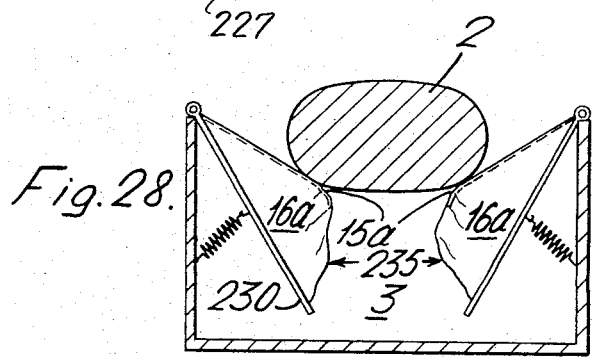
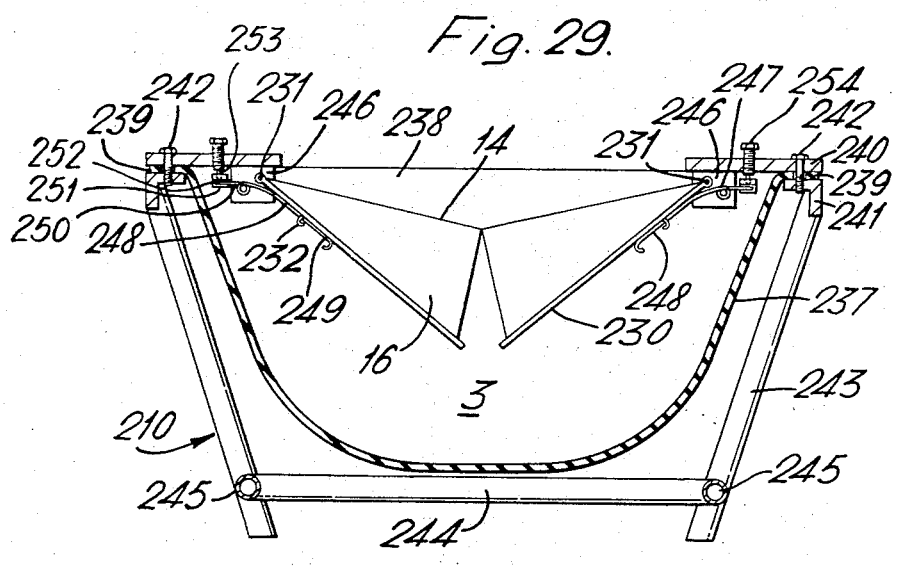

Sept. 12, 1967  L. A. HOPKINS  3,340,551
APPARATUS FOR SUPPORTING A BODY ON A GASEOUS CUSHION
Filed April 26, 1966  27 Sheets-Sheet 17
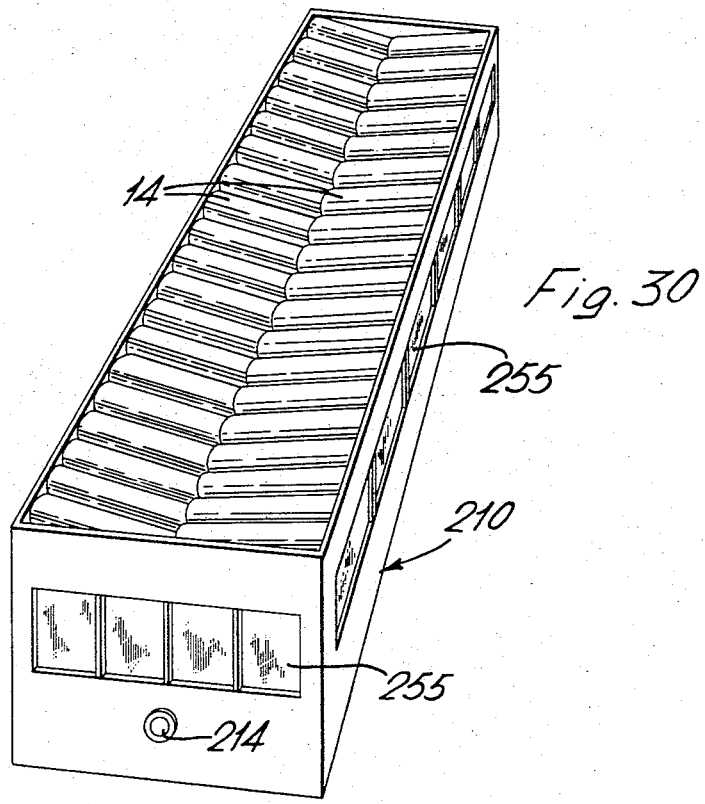
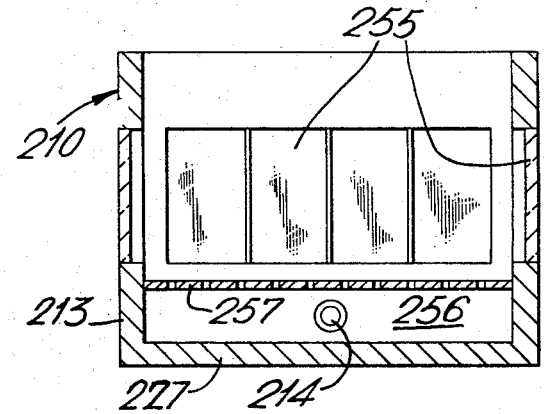
INVENTOR
L. A. HOPKINS
BY
Cameron, Kerkam & Sutton
ATTORNEYS Sept. 12, 1967  L. A. HOPKINS  3,340,551
APPARATUS FOR SUPPORTING A BODY ON A GASEOUS CUSHION
Filed April 26, 1966  27 Sheets-Sheet 18

INVENTOR
L. A. HOPKINS
BY
Cameron, Kerkam & Sutton
ATTORNEYS

Sept. 12, 1967 L. A. HOPKINS 3,340,551
APPARATUS FOR SUPPORTING A BODY ON A GASEOUS CUSHION
Filed April 26, 1966 27 Sheets-Sheet 19
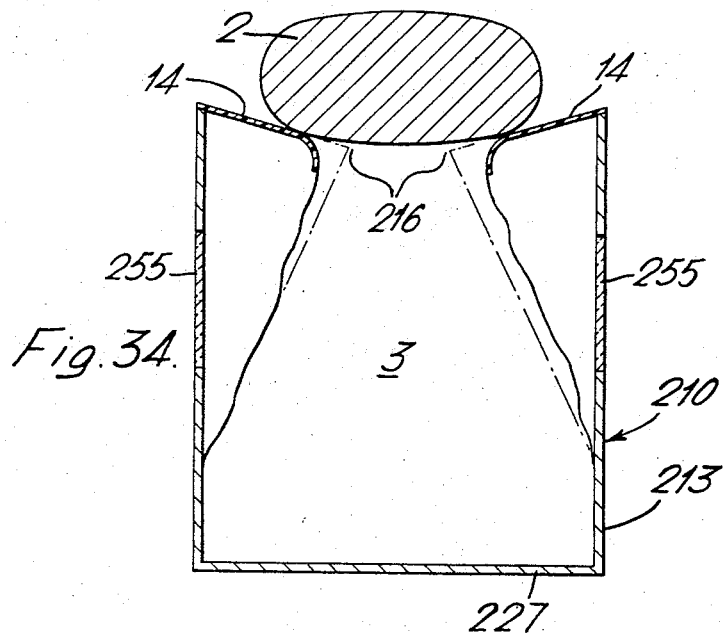
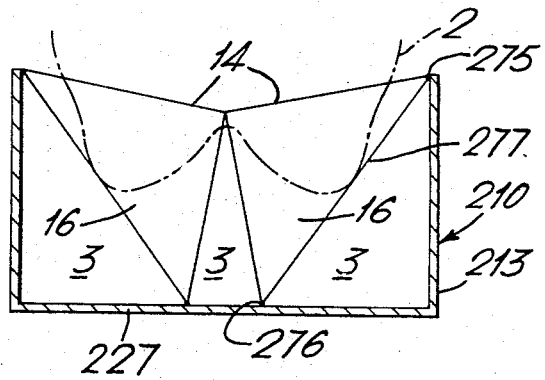
INVENTOR
L. A. HOPKINS
BY
Cameron, Kerkam & Sutton
ATTORNEYS

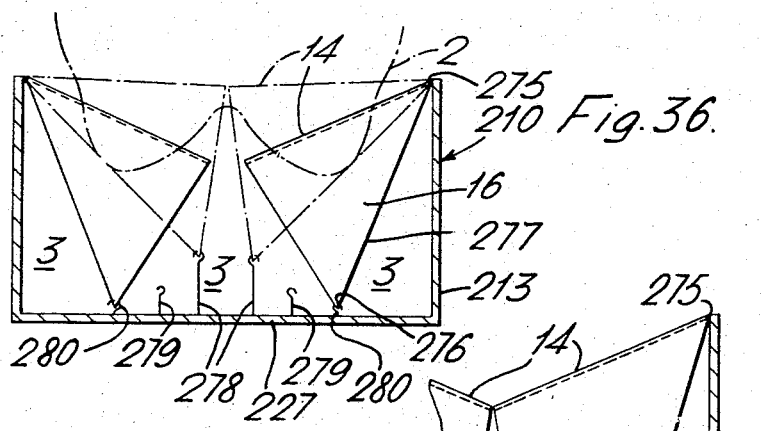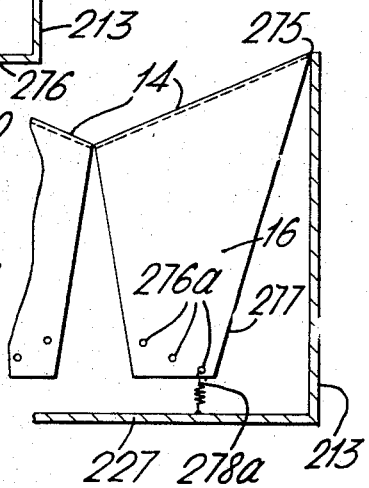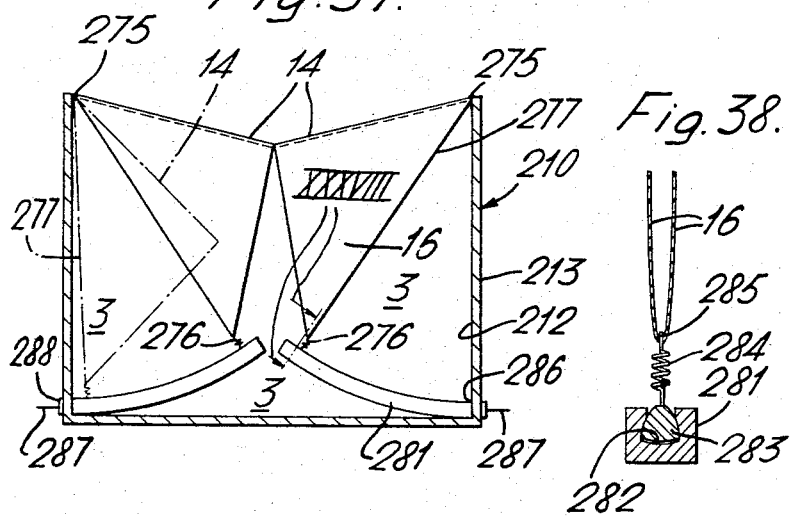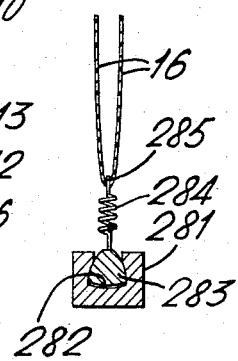

Sept. 12, 1967  L. A. HOPKINS  3,340,551
APPARATUS FOR SUPPORTING A BODY ON A GASEOUS CUSHION
Filed April 26, 1966  27 Sheets-Sheet 21
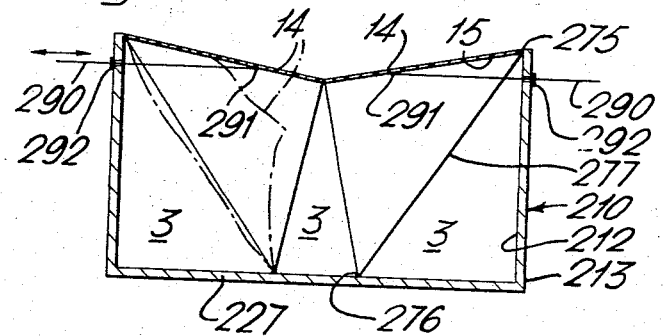
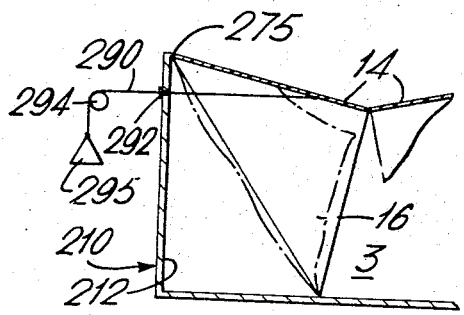
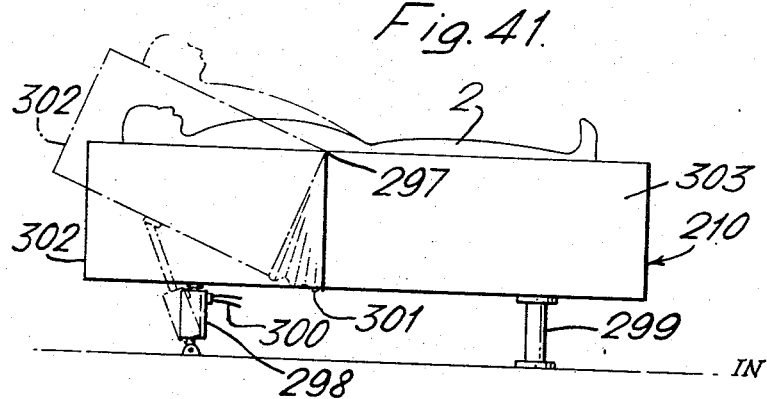
INVENTOR
L. A. HOPKINS
BY
Cameron, Kerkam & Sutton
ATTORNEYS

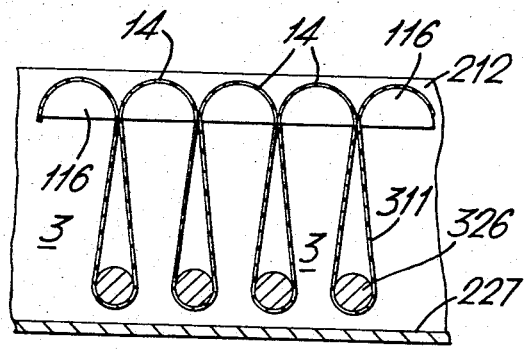
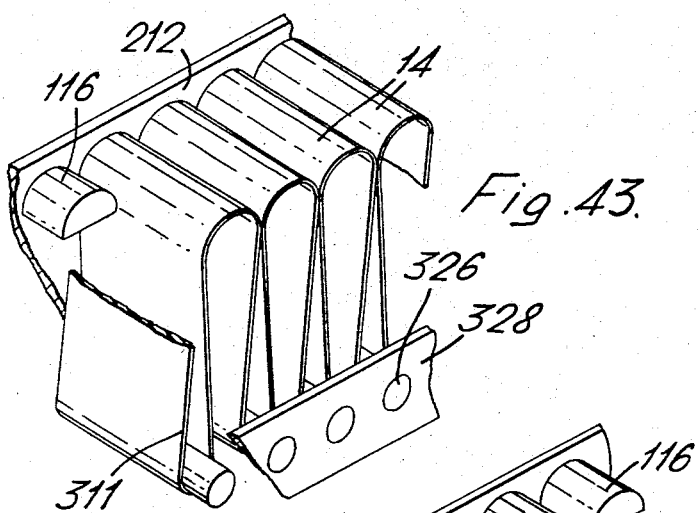
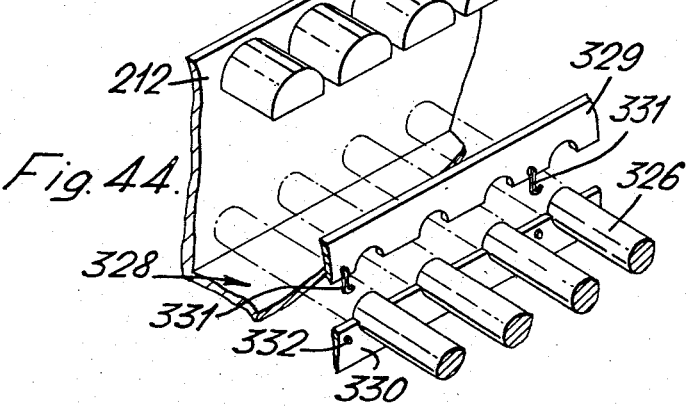

Sept. 12, 1967　　　　　　　L. A. HOPKINS　　　　　　3,340,551
APPARATUS FOR SUPPORTING A BODY ON A GASEOUS CUSHION
Filed April 26, 1966　　　　　　　　　　　　　　27 Sheets-Sheet 23
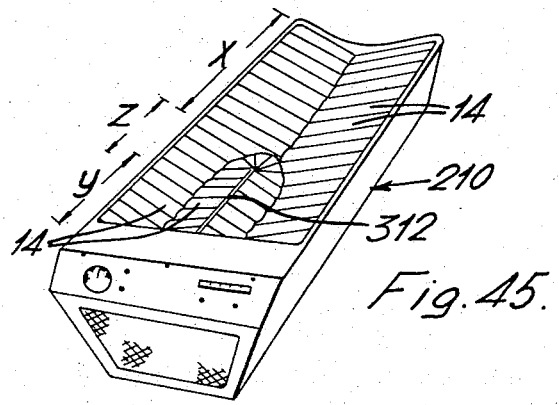
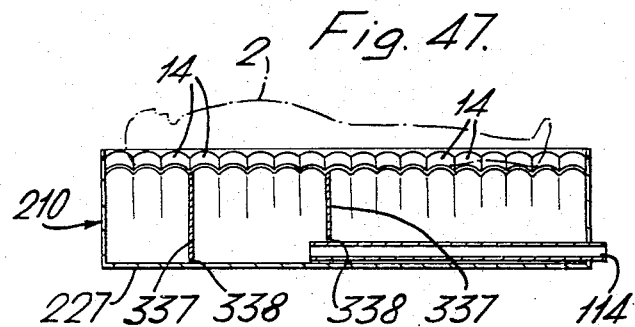
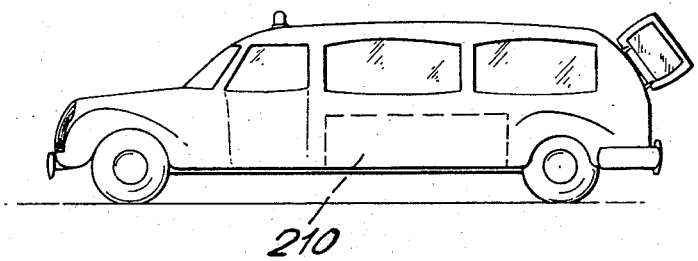
INVENTOR
L. A. HOPKINS
BY
Cameron, Kerkam + Sutton
ATTORNEYS Sept. 12, 1967  L. A. HOPKINS  3,340,551
APPARATUS FOR SUPPORTING A BODY ON A GASEOUS CUSHION
Filed April 26, 1966  27 Sheets-Sheet 24

INVENTOR
L. A. HOPKINS
BY
Cameron, Kerkam & Sutton
ATTORNEYS

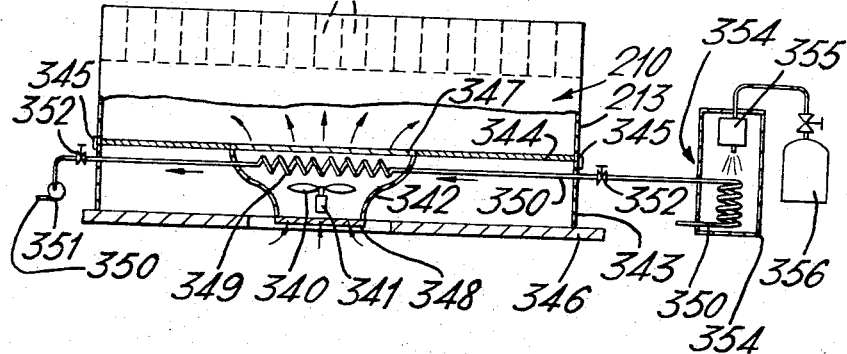

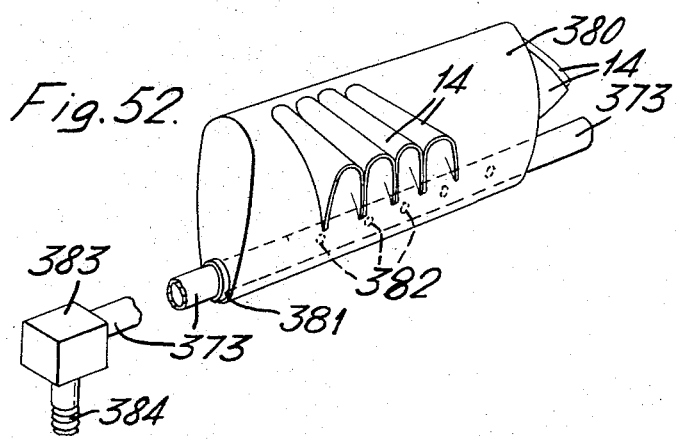
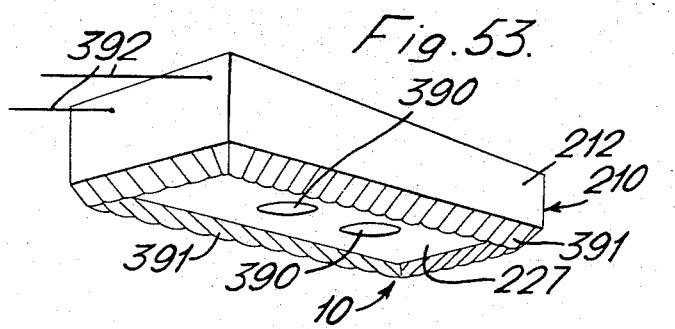
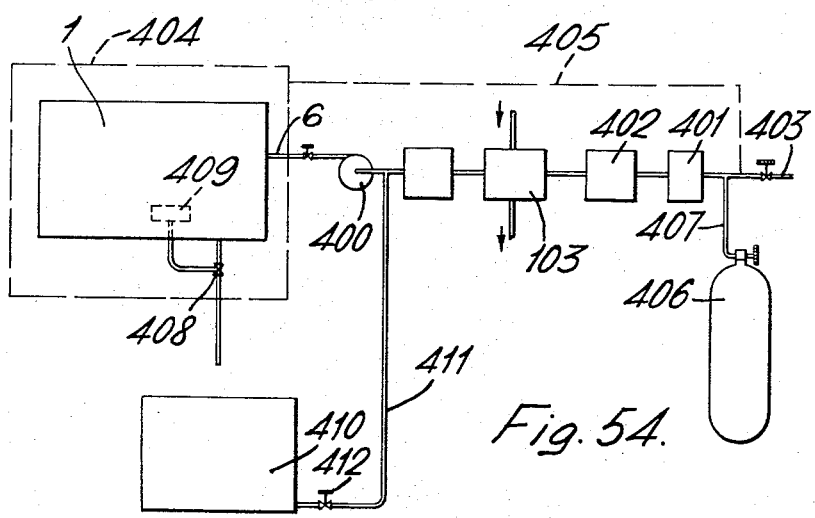

United States Patent Office 3,340,551
Patented Sept. 12, 1967

3,340,551
APPARATUS FOR SUPPORTING A BODY ON A GASEOUS CUSHION
Leslie Arthur Hopkins, Dibden Purlieu, England, assignor to National Research Development Corporation, London, England, a British corporation
Filed Apr. 26, 1966, Ser. No. 545,388
Claims priority, application Great Britain, Apr. 27, 1965, 17,642/65, 17,643/65; July 21, 1965, 31,007/65
30 Claims. (Cl. 5—348)

This invention relates to apparatus for supporting a body on a gaseous cushion and is primarily concerned with apparatus for supporting the bodies of injured human beings or animals, or at least parts thereof.

One of the problems associated with the treatment of persons having severe lacerations or burns is that friction between the injured tissue and the supporting bed, or surrounding bedclothes, can cause severe pain, can damage partially healed tissue and can cause infection. As it is substantially impossible and indeed undesirable to totally immobilize a burned or lacerated person, friction resulting from body movement does occur and with it the stated risks and discomforts.

These risks and discomforts can be at least reduced by supporting the body on a gaseous cushion and the invention is concerned with apparatus for providing such a cushion.

According to the invention, apparatus for supporting at least part of a body on a gaseous cushion comprises a base structure, flexible barrier means attached to the base structure, the barrier means being constructed from flexible, sheet material, inflatable so as to co-operate with the base structure and the body part when the body part is brought into a contiguous relationship with the barrier means and define with the body part and the base structure a cushion space, and means for supplying pressurized gas to the cushion space so as to form therein a pressurized cushion of gas to provide support to the body part.

The flexible barrier means may comprise rows of separate barrier members of sheet material, each defining a concavity, the hollow of which is presented towards the cushion space, a side portion of each barrier member being contiguous with the adjacent side portion of a neighbouring barrier member and serving as tie means for constraining the barrier member against deflection away from the cushion space by the pressure of gas therein, the arrangement being such that in operation pressurized gas which may be from the cushion space enters the barrier members to inflate them and in so doing urge the contiguous side portions of neighbouring barrier members towards each other.

Such barrier members may be disposed in two rows facing each other across the top of the base structure. Parts of the barrier members of one row are preferably arranged to be contiguous with adjacent parts of the barrier members of the oppositely-facing row so as to form a substantially unbroken surface extending across the top of the base structure.

The barrier members may be provided with means (such as weights or elastic ties) biasing the barrier members towards the cushion space in opposition to upward forces exerted by the cushion so that, when a body part is brought into contiguous relationship with the barrier members whereby the normal pressure differential across the barrier members is substantially reduced, adjacent parts of the barrier members in the oppositely-facing rows will sink into the cushion space.

Parts of the apparatus other than the flexible barrier means may be made of flexible, sheet material.

The positions of parts of the flexible barrier means, relative to the base structure, are preferably adjustable so as to accommodate, on the same apparatus, profile changes in a body part and/or body parts of differing dimensions.

Figure 2B:
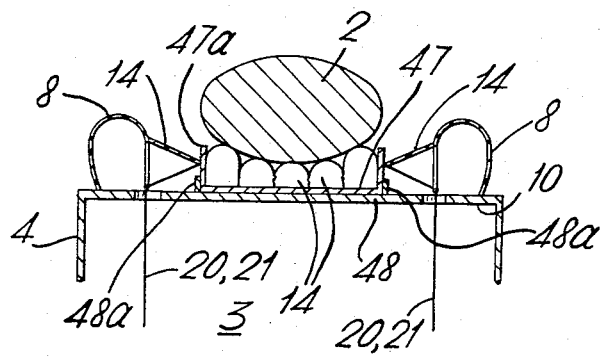
Figure 17:
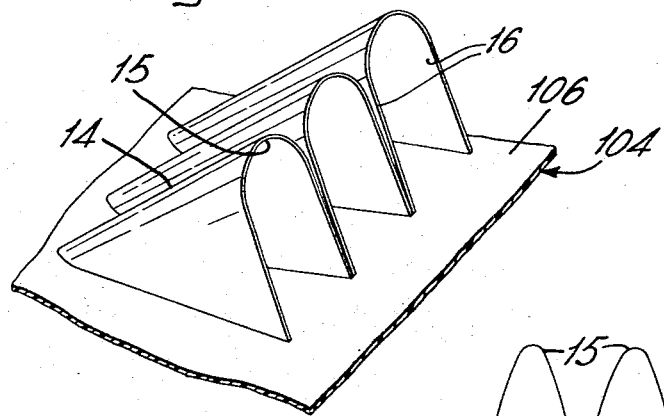
Figure 18:
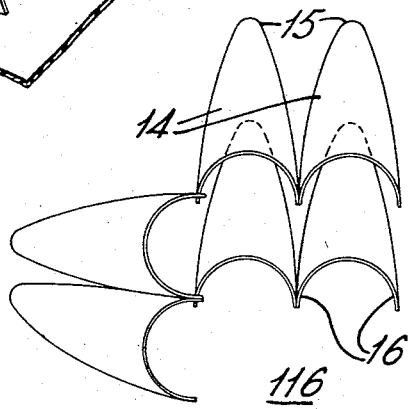
Figure 19:
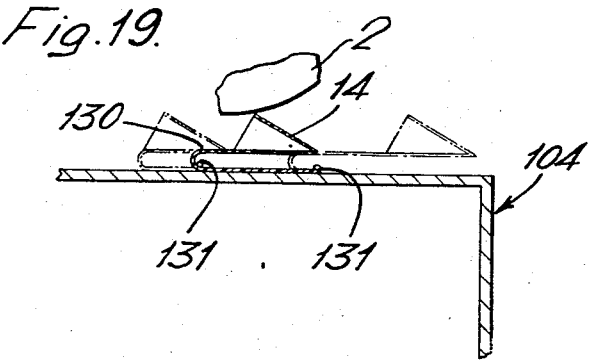
Figure 20:
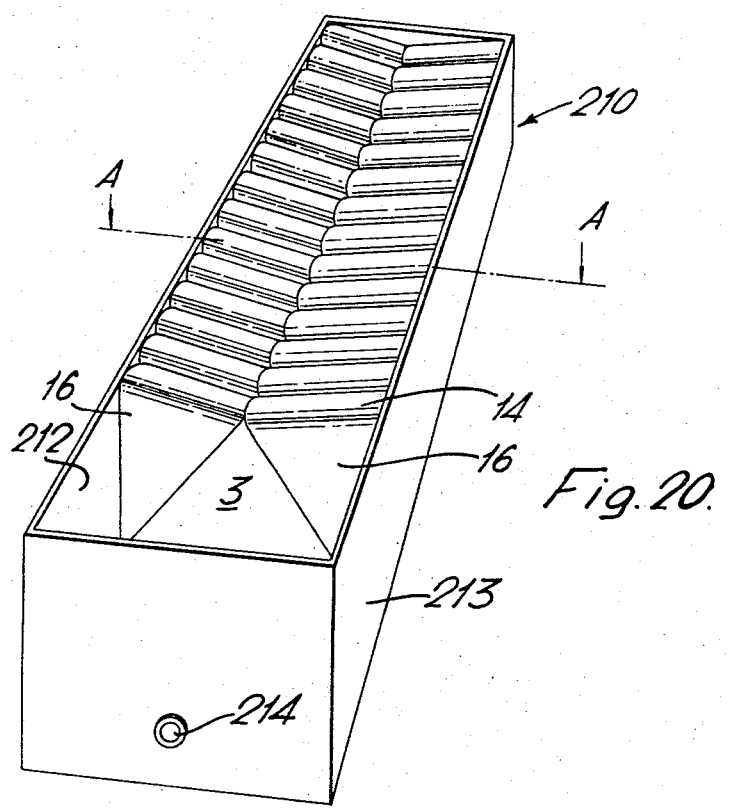
Figure 21:
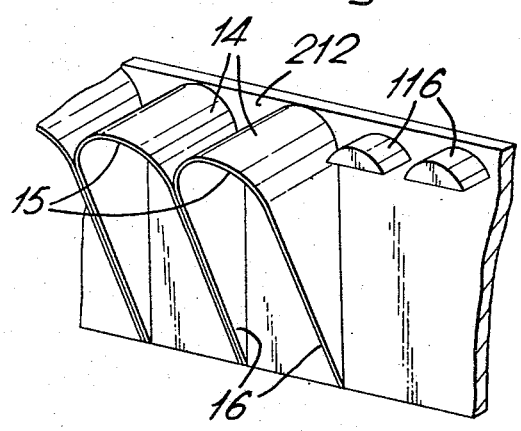
Figure 22:
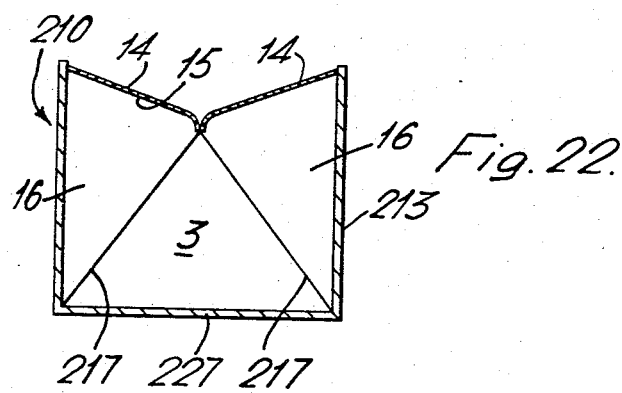
Figure 23:
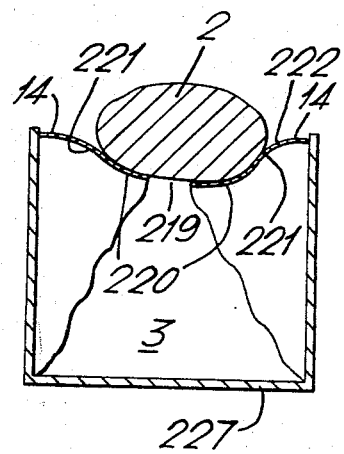
Figure 24:
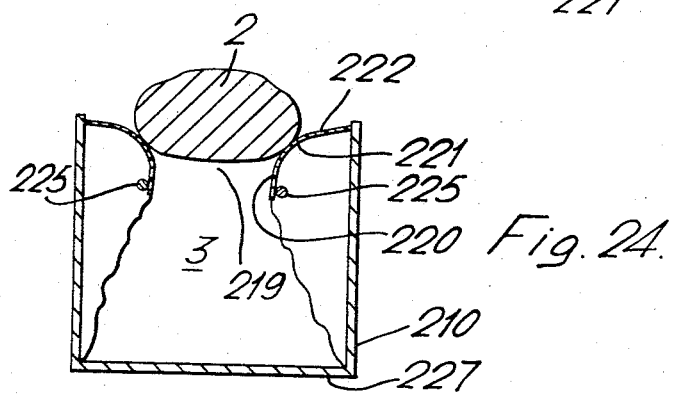

Embodiments of the invention will now be described by way of example with reference to the accompanying drawings wherein:

FIGURE 1 is a side view of one embodiment of apparatus according to the invention, FIGURE 2 is a plan view of the apparatus of FIGURE 1, FIGURE 2A is a fragmentary plan view similar to part of FIGURE 2 and illustrates a modification thereof, FIGURE 2B is a section taken on lines IIB—IIB of FIGURE 2A, FIGURE 3 is a section, to an enlarged scale, taken on the lines III—III of FIGURE 2, FIGURE 4 is an enlarged detail, in perspective, of part of FIGURE 3, FIGURES 3A and 4A are views similar to those shown by FIGURES 3 and 4 respectively and illustrate modifications thereof, FIGURE 5 is a fragmentary view, in section, of one modification of the embodiment of FIGURES 1 to 4, FIGURE 6 is a cross-sectional view of a further modification of the embodiment of FIGURES 1 to 4, FIGURE 6A is a view similar to that of FIGURE 6 and illustrates a modification thereof, FIGURE 7 is a plan view of the modification of FIGURE 6, FIGURES 8 and 9 are enlarged details illustrating differing modifications of the parts enclosed by the box A of FIGURE 6, FIGURES 10 and 11 are fragmentary details, to an enlarged scale, of part of the arrangement of FIGURES 6 and 7, FIGURES 12, 13 and 14 are fragmentary views in section illustrating three further embodiments of apparatus according to the invention, FIGURE 15 is a plan view, in section, of body-supporting apparatus according to another embodiment, FIGURE 16 is a section on the lines XVI—XVI of FIGURE 15, FIGURE 17 is a view in perspective of part of FIGURE 15, FIGURE 18 is an enlarged detail of the box XVIII of FIGURE 15, FIGURE 19 is a fragmentary cross sectional view illustrating a modification of the apparatus of FIGURES 15 to 17, FIGURE 20 is a perspective view of another form of apparatus according to the invention with some flexible barrier members removed to show the manner of construction, FIGURE 21 is a perspective view of a number of barrier members, FIGURES 22, 23 and 24 are cross-sections on line A—A of FIGURE 20 showing the apparatus respectively before a body is rested on the apparatus, immediately after a body is rested on the apparatus and when the body is supported by the apparatus.

Figure 32:
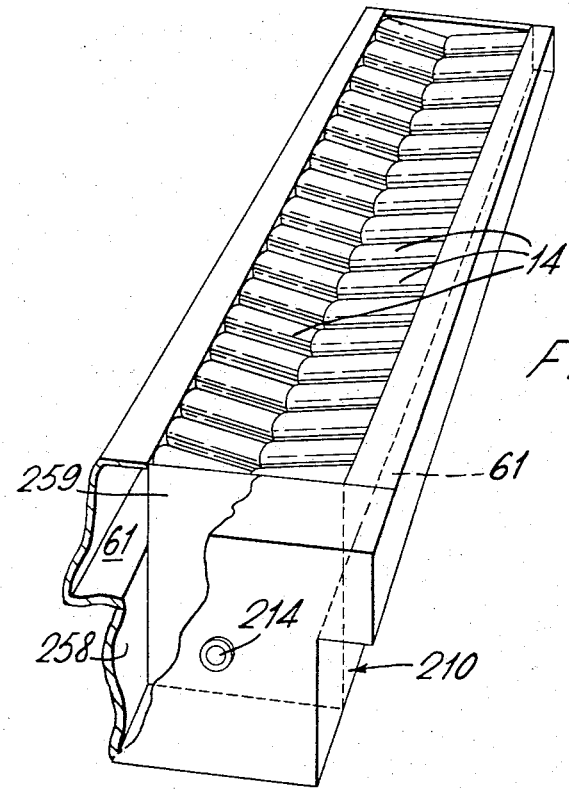
Figure 33:
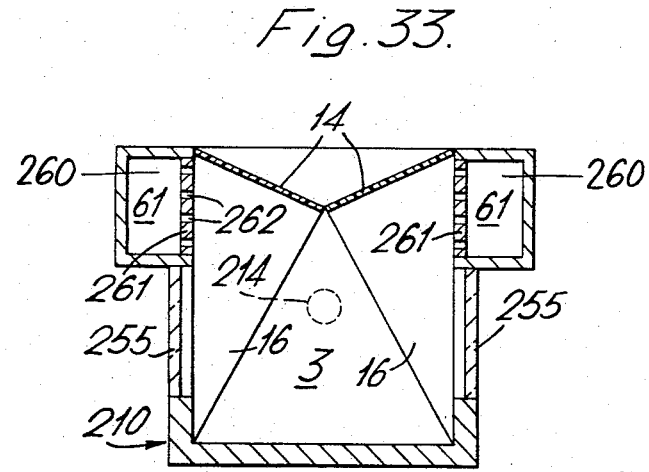
Figure 46:
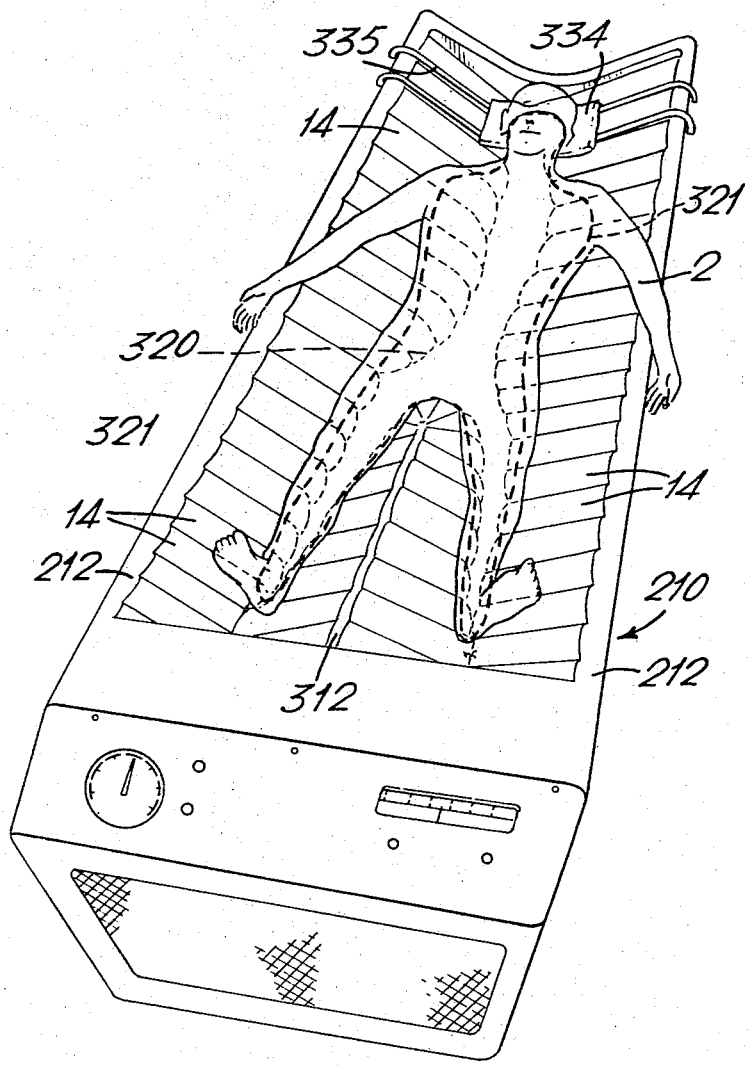
Figure 55:
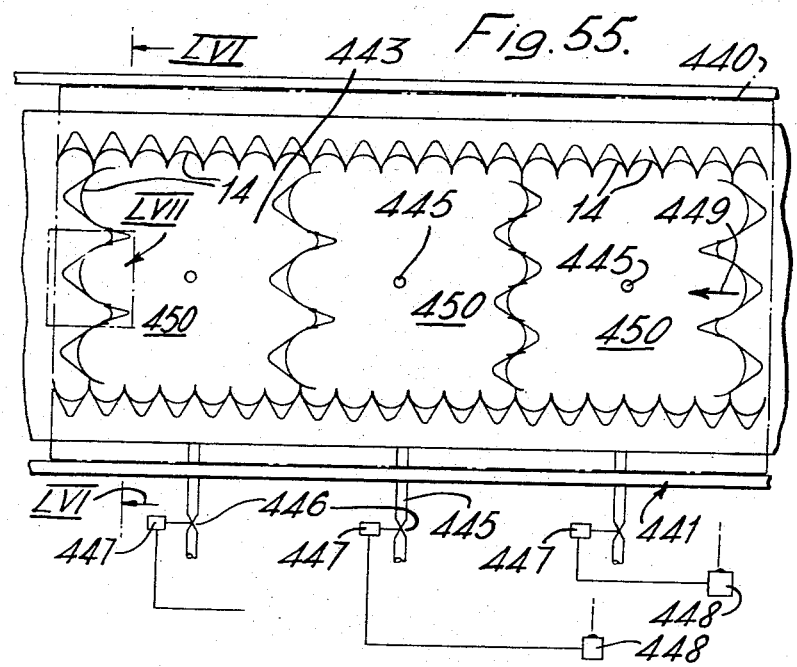
Figure 56:
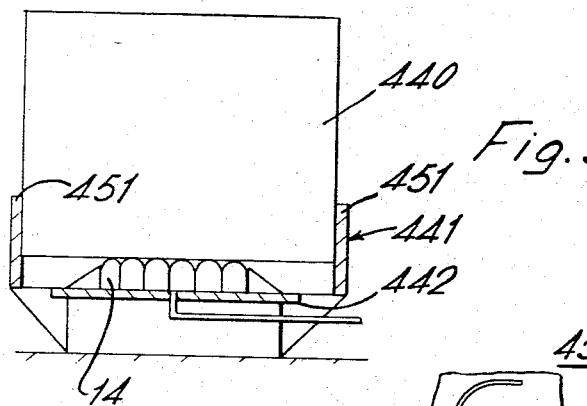
Figure 57:
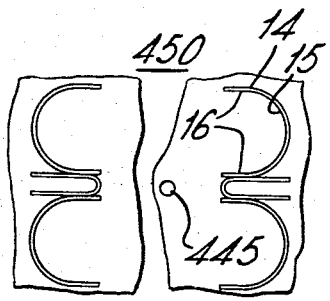

FIGURES 25 and 26 are views similar to FIGURE 22 and illustrate further modifications of the apparatus of FIGURE 20, FIGURES 27 and 28 are further modifications of the apparatus of FIGURE 20 and illustrate different operating positions of the barrier members, FIGURE 29 shows a further form of the apparatus according to the invention and illustrates apparatus adapted for supporting the torso and legs of a human being, FIGURE 30 is a perspective view of a further modification, FIGURE 31 is a cross-section through the apparatus of FIGURE 30, showing the internal construction thereof, FIGURE 32 is a perspective view of a further modification, FIGURE 33 is a cross-sectional view of the apparatus of FIGURE 32, FIGURE 34 is a cross-sectional view of a further modification, FIGURE 35 is a cross-sectional view of a further modification, FIGURES 36, 36A and 37 illustrate differing modifications of the arrangement illustrated in FIGURE 35, FIGURE 38 is a section, to an enlarged scale, taken on the lines XXXVIII—XXXVIII of FIGURE 37, FIGURES 39 and 40 are cross-sectional views of two further modifications, FIGURE 41 is a side view of another modification, FIGURE 42 is a longitudinal cross-section and illustrates the construction of another form of barrier members, FIGURES 43 and 44 are views in perspective of the modification of FIGURE 42, FIGURES 45 and 46 are views in perspective of a further modification of body-supporting apparatus, FIGURE 47 is a longitudinal cross-section of a modification of the apparatus of FIGURE 45, FIGURE 48 shows the apparatus of FIGURES 45 and 46 installed in an ambulance, FIGURE 49 is a longitudinal cross-sectional detail, to an enlarged scale, of the apparatus 210 of FIGURE 48, FIGURE 50 is a view in perspective of another modification of the apparatus of FIGURES 45 and 46, FIGURES 51 and 52 are details, in perspective, and to an enlarged scale, of parts of the apparatus of FIGURE 50, FIGURE 53 is a view in perspective, seen from below, of a further modification, FIGURE 54 illustrates diagrammatically the supply of air to a body-supporting apparatus, FIGURE 55 is a plan view, partly in section, of a further embodiment of the invention, FIGURE 56 is a cross-section taken on the lines LVI—LVI of FIGURE 55, and FIGURE 57 is an enlargement of parts enclosed by the box LVII of FIGURE 55.

With reference to FIGURES 1 to 4, apparatus 1 for supporting at least the major part of a human body 2 on a gaseous cushion 3 comprises a box-like base structure 4 and a pair of flexible barriers 7 attached to the sides of the base structure 4, one on each side of the body 2. The barriers are constructed of thin (e.g. .020″) sheets of flexible material such as polyurethane or Hypalon-coated nylon weighing about 3 ounces per square yard, inflated so as to co-operate with the base structure 4 and adjacent parts of the body 2 when the body 2 is brought into a contiguous relationship with the barriers 7 and define, with the body and the base 4, a cushion space. A duct 6 is provided for supplying pressurized air to the cushion space so as to form the cushion 3 therein. The flexible barriers 7 are inflated by the cushion air they themselves retain in the space. Cushion pressure is in the order of 35 lbs. per square foot.

In further detail, and with particular reference to FIGURES 3 and 4, the flexible barriers 7 each comprise sheet-like membranes 8 folded to loop-like shapes having one longitudinal edge 9 attached to an inwardly disposed flange 10 forming part of the base 4. The longitudinal edge 11 opposite the edge 9 carries a row of discrete, contiguous barrier members 14, each constructed from a membrance of frusto-triangular form folded to give the barrier member a U-like lateral cross-section with a concave portion 15, the hollow of which is presented to the cushion space. The rows of barrier members 14 face each other across the top of the base 4. Two side or tie portions 16 extend inwardly from the concave portion 15 towards the cushion 3. A side portion 16 is contiguous with the adjacent side portion of the neighbouring barrier member. Cushion air inflating the barrier members 14 urge their contiguous side portions 16 together to form an air seal therebetween. The inner or free edges of the side portions 16 of each barrier member 14 make an angle not substantially less than 90° to the part forming the concavity 15 thereof, the upward forces exerted by the cushion 3 maintaining the member in tension so that it does not wrinkle. Further information pertinent to the construction of a barrier member 14 is disclosed in copending application Ser. No. 566,948, filed July 21, 1966 as a continuation-in-part of Ser. No. 267,695, filed Mar. 25, 1963, now abandoned, which describes and claims a cushion-retaining flexible wall structure comprising a plurality of barriers each of form similar to that of a barrier member 14. Rods 17 of plastics material are attached to the inner edges of the tie portions 16 of every third barrier member 14. Rods 18 pierce the inner corners of said tie portions to hold the three barrier members 14 together. The side or tie portions 16 of adjacent barrier members 14 can deflect substantially relative to each other.

The barrier members 14 are constrained against upward deflection by the cushion 3 by means of tie cords 20, 21 attached to opposite ends of the rods 17, the tie-cords being wound round pulleys 22, 23 attached to the inner ends of horizontally-disposed spindles 24, 25 projecting through the side walls of the base 4. The outer ends of the spindles 24, 25 are provided with handles 26, 27 and the spindles are rotatable in vertically-disposed supports 28, 29, the upper ends of which are attached to the flange 10.

The space occupied by the cushion 3 is divided into three compartments by two walls 32 disposed cross-wise within the base 4 and extending to within the duct 6. Air flow to the cushion compartments is controlled individually by three butterfly valves 33 and the three compartments are maintained at differing pressures according to the surface densities of the body parts. The body's legs, for example, can be supported by a cushion pressure lower than that required for the remaining parts of the body. Laterally-disposed barrier members 14 (not shown) attached to the walls 32 provide seals between the compartments. In this embodiment, the head and feet of the body 2 are not supported by the cushion 3, the head being supported at the neck by a resilient support 34. The feet of the body 2 hang over one end of the base 4 and are supported at the ankles by U-like recesses cut into the end. The neck of the body 2 is air-sealed to the base 4 by a semi-circular muff 35 attached to the support 34.

The legs of the body are air-sealed by the combination of a leg-divider 36 (FIGURES 1 and 2 only) and a plurality of barrier members 14 attached thereto. The leg-divider 36 is a plane structure having a plan-form of generally triangular shape and is movable, relative to the base 4, towards or away from the body 2 to accommodate variations in leg-lengths. The leg-divider 36 is moved by means of a screwed rod 37 engaging with an internally threaded block 38 attached to the base 4 by way of a support bracket 39. The base 4 is supported clear of the ground 11 by a cradle 12 (FIGURE 1 only).

With reference to FIGURE 3 only, the upper edges of the walls 32 carry hollow, inflatable supports 42 each connected, by way of a supply duct 43 and control valve 44, to a source of inflating air. Each duct 43 has a pressure gauge 45 and a vent valve 46 tapped into it, the valve 44, gauge 45 and vent valve 46 being disposed outside the base 4.

In operation, for support of a badly-burned body 2, with the valves 33 in the duct 6 closed, the supports 42 are inflated, the valves 44 then closed and the body 2, in a horizontal position, is lowered gently on to the supports 42. This positioning can be achieved without restriction by the barriers 7 (and barrier members 14 adjacent the inside of the legs) as the latter, not being inflated, merely lie on top of the flanges 10. The leg-divider 36 is now positioned, its barrier members 14 hanging limply in the spaces between the body's legs and the divider itself.

With the duct 6 connected to a source of pressurized sterile air, one or more (depending on the area of the body 2 to be supported by the cushion 3) of the valves 33 is now opened and the air allowed to fill the interior of the chamber 4 so as to inflate the flexible barriers 7 whereby they take up shapes somewhat as shown in FIGURE 3. The body 2 combines with the flexible barriers 7 to trap air within the space defined by the base 4 and the barriers 7 so as to form the cushion 3. The handles 26, 27 are now turned to adjusting the positions of the barriers 7 relative to the base 4 (and hence the body 2), by winding-up or paying-out the tie-cords 20, 21 so as to position, by vertical and horizontal movements, the inner extremities of the concavities 15 of the barrier members 14 whereby they just touch, or have a small clearance from adjacent side parts of the body 2. As can be seen by comparing the left and right hand halves of FIGURE 3, particularly the dotted lines 48, 49 of the left-hand half, the flexible barriers 7 can operate over a wide range, merely by adjusting the tie-cords 20, 21 to vary the cross-sectional profiles of the barriers 7, the latter serving as flexible extensions connecting the barrier members 14 to the base 4. This variation not only accommodates variations in profile along the length of the body 2 but also substantial variations in width as, for example, occur in the body of a small child and a fully-grown adult.

Oppositely-facing flexible barriers 7 should be positioned so as to have "mirror-image" profiles so that the body 2 is positioned centrally within the base 4. It will be appreciated that formation of the cushion 3 can be controlled not only by movement of one or more of the valves 33 but also "manually," i.e. by an operator holding down or parting several of the barrier members 14, so as to allow air to escape to atmosphere. This technique can also be used, at a later stage, to examine cushion-exposed parts of the body 2.

Air filling the interior of the base 4 also inflates the barrier members 14 attached to the leg-divider 36 and a good air seal around the insides of the legs can be achieved by fine "axial" adjustment of the divider, through rotation of the handle 40. A very efficient air seal is unlikely to be achieved here without some distortion of the barrier members 14 but this is no great disadvantage as contact pressures exerted by the members 14 are very small and impose no great discomfort. A better seal could be provided, if required, by providing the barrier members 14 with flexible extensions similar to the membranes 8 (but of smaller size) with associated profile-varying tie-cords.

When the body 2 is wholly supported by the cushion 3, this will be indicated by the pressure gauges 45 as a drop in pressure within the inflated supports 42. The flexible barriers 7 can now be given "fine" adjustments and the supports 42 deflated (if required) by closing the control valves 44 and opening the vent valves 46.

The flexible barriers 7 (and similarly the leg-sealing barrier members 14) co-operate with the body 2 to impede the escape of cushion air from within the base 4, so as to provide a highly-efficient cushion containment. Accordingly, once the cushion 3 has been established, as little air is required to replace that which does escape, the equipment necessary for supply, heating and sterilizing the air fed to the duct 6 need be of relatively small capacity.

In the modification of FIGURES 2A and 2B, the torso of the body 2 is sealed off from its head by a lateral row of barrier members 14 (the concavities of which face towards the feet of the body 2) attached to a "channel-like" support structure 47 slidable, in a longitudinal direction, on a rigid panel 48 extending between opposite flanges 10 of the base structure 4. A pair of guide strips 48a attached to the top surface of the panel 48 prevent sideways movement of the structure 47. The panel 48 is perforated to allow free passage of the tie-cords 20, 21. The barrier members 14 of the barriers 7 contact the upright sides 47a of the structure 47 to form a seal therewith. The head of the body is supported by a pillow 49 resting on the structure 47.

In the modification of FIGURES 3A and 4A, the barrier members 14 are "rotated" so that their concavities 15 face radially outwards relative to the cushion. In this modification a single spindle 24 or 25 replaces each pair of spindles 24 or 25 of FIGURE 3 so that rotation of each spindle results in a symmetric adjustment of the positions of oppositely facing barrier members 14. Also, in this modification, the tie-cords 20 pass over pulleys 20a attached to the under-surfaces of the flanges 10 so that the tie-cords extend from the barrier members initially horizontally and thereafter vertically towards the spindles 24. A further difference possessed by this modification is that (FIGURE 4A) the tie cords 21 are attached to the barrier members 14 through groups of side portions 16, each tie cord being connected to six side portions, the side portions 16 of every fourth barrier member 14 of each row being attached to neighbouring tie-cords 21 as shown.

With reference now to FIGURE 5, the apparatus 1 can be modified by replacing the membranes 8 by support-boards 51 which are connected to base-boards 52 by hinges 53. The base-boards 52 are slidably supported by the upper face of the flange 10 and are constrained to lateral movement (relative to the body 2) by clamp-like restraints 54 attached to the flange. The restraints 54 are provided with locking screws 55 for securing the base-boards 52. The angle between the boards 51, 52 can be varied by a lockable adjuster 56 of telescopic construction. In operation, the position of the barrier members 14, relative to the base 4 and also the body 2, is adjusted by lateral movements of the base-boards 52 and/or pivoting movements of the boards 51 about their hinges 53.

With reference now to FIGURE 6, a cheap, portable body supporting apparatus 51 shown therein is basically similar to that illustrated in FIGURES 1 to 4 but has a shallow box-like base structure 52 which is supplied with air by way of a supply duct 53 fitted with a control and shut-off valve 54. A single flexible barrier 7 of annular form is attached to the base 52 and the profiles of oppositely-facing parts of the flexible barrier are adjusted symmetrically by tie-cords 55, 56. Tie-cords 55 extend from anchorage points (eyelets) 57 on the inner corners of the side portions 16 round a pulley 58 attached, through a resilient column 58a, to the floor of the base 52 and then through a hole 59 in the membrane 8 of the left-hand side of the barrier 7. The tie-cords 55 are anchored by tying knots in those parts of the tie-cords external of the membranes 8. The tie-cords 56 extend vertically from anchorage points 60 (eyelets) on the outer corners of the side portions 16, round pulleys 61 mounted on the floor of the chamber 52 and then horizontally through holes 62 in the left-hand side of the base 52 to be anchored by an external knot, as in the case of the tie-cords 55.

In operation, by drawing in or letting go the tie-cords 55, 56, i.e. by varying their effective length, the profiles of oppositely-facing parts of the flexible barrier 7 can be varied symmetrically.

In the modification of FIGURE 6A, the resilient column 58a can be dispensed with whilst still retaining the feature of symmetric adjustment of oppositely-facing barrier members, by attaching a tie-cord 55 to each point 57, passing the tie-cord 55 attached to the left-hand barrier members 14 first round pulleys 58 mounted on the right-hand side of the floor of the base 52 and then under pulleys 58 mounted on the left-hand side thereof and by passing the tie-cords 55 attached to the right-hand barrier members 14 under the left-hand pulleys 58 also. The gathered tie-cords 55 then pass through the left-hand side of the base 52 to an external anchorage. Paying out or drawing in the gathered tie-cords 55 simultaneously causes oppositely-facing barrier members 14 to move towards or away from each other symmetrically.

Similarly, the tie-cords 56 extend from attachment points 60 on the right-hand barrier members 14 round pulleys 61 mounted on the right-hand side of the floor of the base 54 and then under pulleys 61 mounted on the left-hand side thereof. Tie-cords 56 also extend vertically from attachment points 60 on the left-hand barrier members 14, under the left-hand pulleys 61 where they are gathered with the tie-cords 56 from the right-hand barrier members 14, the gathered tie-cord passing through the left-hand side of the base 54 to an external anchorage point. Paying out or drawing in the gathered tie-cords 56 simultaneously causes oppositely-facing barrier members 14 to rise and fall symmetrically.

With reference to FIGURE 8, a tie-cord 55 (or similarly a tie-cord 56) can be anchored, as indicated by the arrows, by winding the cord around a cleat 63 of hard rubber bonded to the outer surface of a membrane 8. Alternatively, with reference to FIGURE 9, a tie-cord 55 can be passed successively through three holes 59 in a membrane 8, as indicated by the arrows. Anchoring is here achieved by friction between the tie-cord 55 and the inner and outer surfaces of the membrane 8.

In a further (non-illustrated) modification, both pairs of tie-cords 55, 56 are attached to rotatable pulleys in the manner illustrated in FIGURE 2, so that they are let out or drawn in by rotating handles attached to spindles carrying the pulleys.

With reference now to FIGURES 10 and 11, the legs of the body 2 are supported by rows of barrier members 14 mounted on a flexible panel 71 extending between opposite parts of the flexible barrier 7. Adjacent barrier members 14 are nested together in oppositely-facing rows, as shown in FIGURE 10, the rows extending normal to the plane of the figures. The arrangement shown in FIGURE 10 is not a true illustration as the barrier members 14, being subjected to a zero pressure differential, would actually collapse under their own weight to lie limply on top of the panel 71. The barrier members 14 are shown "inflated" in FIGURE 10 only to illustrate their grouping and relative positions.

In operation, the leg 70 is lowered to contact the limp barrier members 14 whereupon air escaping from the base 52 along the rear of the body 2 is trapped between the members 14 nearest to the side parts of the leg. The trapped air inflates those members 14 and holds them in sealing engagement with the leg 70. The air so trapped forms a supporting cushion 72. The barrier members 14 immediately below the leg 70, being wholly within the cushion 72, are subjected to a zero pressure differential and thus rest limply on the panel 71. The barrier members 14 outside the leg 70 are similarly subjected to a zero pressure differential and rest limply on those barriers which are inflated.

With reference to FIGURE 12, the flexible barriers 7 can be replaced by flexible barriers 75 comprising simple, sheet-like membranes 76 each having one longitudinal edge 77 attached to the flange 10 and the opposite edge 78 constrained by one or more tie-cords 79 to give the membrane, when inflated, a loop-like vertical cross-section. The cross-sectional profile of a barrier 75 can be varied by paying out or drawing in its tie-cords 79. Like the flexible barriers 7, the barriers 75 are also inflated by cushion pressure.

FIGURE 13 shows an arrangement wherein flexible inflatable barriers 84 of closed shape, inflated from a source other than the cushion 3, co-operate with the body 2 and base 4 in containing the cushion 3. The barriers 84 each comprise a sheet-like membrane 85, one longitudinal edge 86 of which is attached to the flange 10 and the opposite edge 87 is attached to the lower edge of a longitudinal slot 88. The membrane 85 carries a row of barrier members 14 and has a row of apertures 89 adjacent the concave portions 15 of the members 14. Panels 90 of flexible sheet material extend between the side portions 16 of each flexible barrier 14 and are spaced inwardly from the concavities 15 thereof to define nozzles 95. In operation, pressurized air is fed through the duct 88 to inflate the membrane 85 and to flow through the apertures 89 and nozzles 95 to issue from the edges of the barriers 14 in the form of air curtains 91 co-operating with the barriers 14 in containing the cushion 3. Relative positions of the body 2 and a barrier 84 can be varied by varying inflation pressure and/or displacing the barrier 84 bodily by means of a board 92 hinged to the flange 10 at 93. The board 92 is pivoted and also held in a desired position by an electrically operated actuator 94 controlled through electrical signal lines 96. Using the curtains 91, however, requires additional air and their impingement on the body 2 can cause discomfort to a sick person.

Although the presence of air curtains 91 may cause discomfort to a sick person, as local "massage" is induced by the curtain air impinging on the body, the apparatus of FIGURE 12 may be used for physiotherapy or for slimming purposes.

A flexible barrier 14 need not be positioned beneath the lower half of the body 2, as in the above described examples. With reference to FIGURE 14, a flexible barrier 84 modified so as not to provide air curtains, has its barrier members 14 resting on the chest of the body 2, so that the body is held up against the barrier members 14 by pressure of the cushion 3.

The apparatus 1 can also be used to dry burns or other wounds on the body 2. For example, with reference to FIGURE 3, flexible barriers 7 can be held back by clips or the like from local parts of the body 2 so as to allow cushion air to escape and, in so doing, dry a wound adjacent the displaced barrier(s).

Body-supporting apparatus can also be provided wherein a body can be supported without adjustment of the flexible barriers 14.

With reference to FIGURES 15 to 19, apparatus 101 for supporting a badly-burned human body 2 on gaseous cushions 115, 116, 117 and 118 comprises a box-like base structure 104, successions of flexible barrier members 14 distributed over the upper surface 106 of the base 104 in rows to define cushion spaces and ducts 111, 112, 113 and 114 for supplying pressurized air (first sterilized and heated) to the spaces whereby when the body 2 is brought into contiguous relationship with the barrier members 14, the latter are inflated by a build-up in gas pressure in the spaces so that they project upwardly and so that gas retained in the spaces by the barrier members and the body provide the gaseous cushions 115, 116, 117 and 118 supporting the body 2.

In further detail, the flexible barrier members 14 are distributed regularly over the surface 106 to occupy an area having a profile related to a human body. The spaces are superimposed one on another and are of progressively increased area so as to accommodate the differences in sizes existing between a child and an adult. The head of the body 2 is supported by the cushion 115, the torso by the cushion 116, the legs by cushions 117 and the buttocks by the cushion 118. A ring of barrier members 14 suffices for accommodating the heads of both a child and an adult. Two longitudinal, substantially parallel rows of barrier members 14 are required for the body torso, to accommodate differences in body width and these rows define two spaces, one superimposed on the other. Ten longitudinal rows $r^1$ to $r^{10}$ and four lateral rows $r^{11}$ to $r^{14}$ of barrier members 14 accommodate differences in leg sizes of a body.

Where two or more rows of barrier members 14 intersect, a substantial air seal can be made, as shown in FIGURE 18, by cutting slots in the side portions 16 of the corner members, so that they interfit in an "egg-box" fashion.

In operation, control valves 125, 126, 127 and 128 associated with the ducts 111, 112, 113 and 114 respectively are opened to supply air to the cushion spaces which eventually contain the cushions 115, 116, 117 and 118. With the body 2 well clear of the barrier members 14, the latter, being subjected to a substantially zero pressure differential, collapse under their own weight to lie limp on the surface 106, air escaping to the surrounding atmosphere by rising vertically from the surface 106 and by flowing through the spaces between the limp barrier members.

As the body 2 is lowered (in a horizontal attitude) into proximity with the barrier members 14, escape of the air is impeded and the barrier members 14 associated with the spaces become inflated by air trapped in the spaces, the trapped air forming as the body 2 is further lowered the cushions 115, 116, 117 and 118 which support the body. In their air-sealing positions, the upper edges of the barrier members 14 have a very small clearance with the body 2.

With reference to FIGURE 15, in this particular example the body 2 has a profile such that its head is supported by the cushion 115 and the torso by the cushion 116, the sides of the latter being contained by the rows $r^2$ and $r^9$ of barrier members 14. The legs and buttocks of the body 2 are supported by cushions 117 and 118 the cushions 117 being contained by rows $r^2$, $r^3$, $r^8$ and $r^9$ of the barrier members 14, while the cushion 118 is contained by rows $r^{11}$ and $r^{13}$.

Those barrier members 14 which play no part in supporting the body 2, being subjected to a zero pressure differential, merely lie limp, collapsed under their own weight, as for example, the outer barrier members 14 of FIGURE 16.

If the body 2 moves, for example, a leg, some of the barrier members 14 will transfer automatically by inflation from a passive to an active role, so providing the leg with continuous support.

With reference to the modification illustrated in FIGURE 19, part of the body 2 can be adjustably supported by a transverse row of barrier members 14 attached to a strip 130 of flexible material folded back over itself, as shown. The strip 130 is demountably anchored to the base 104 by transversely disposed clamping rods 131. To vary the position of the row of barrier members 14 so as, for example, to vary a sealing point on the body 2, the degree of fold-back of the strip 130 is adjusted accordingly. The clamping rods 131 resist the tendency of cushion pressure to displace the strip 130.

In a further (non-illustrated) modification, the ducts 111, 112, 113 and 114 are replaced by a single duct which supplies pressurized air to the interior of the base structure 104, air then entering the spaces 107, 108, 109 and 110 through the holes at present provided for the ducts 111, 112, 113 and 114.

FIGURES 20 to 24 show a further body-supporting apparatus wherein a body can be supported without adjustment to the flexible barrier members 14.

Referring first to FIGURES 20 and 21 body-supporting apparatus 210 comprises two parallel rows of contiguously-disposed flexible barrier members 14, each of which faces from one side wall 212 of a box-like base structure 213 towards a flexible barrier member 14 extending from the opposite side wall 212 of the base 213 and is also in side contact with its neighbour in the row so as to close the top of the interior of the base and thus form a substantially unbroken surface extending across the top of the base 213. The distance between the side walls 212 is 30 inches and the depth of each wall 212 is 15 inches. The U-like vertical cross-sections of the barrier members 14 are maintained when no pressurized air is present in the chamber 213 by shaped blocks 216 (FIGURE 21 only) of stub-like form which project from those parts of the side walls 212 immediately beneath the concavities 15 of the members 14. The barrier members 14 are attached to the side walls 212 along the edges of their side portions 14.

Pressurized air is supplied to the cushion space defined by the interior of the base 213 through an inlet 214 at one end thereof and the barrier members 14 are inflated by this air to provide an upper boundary to the air cushion 3 formed in the cushion space. The outer edges of the side portions 16 of the barrier members 14 are attached to the side walls 212 of the base structure 213 in any suitable manner (e.g. by pinning or adhesive). The geometric shape of the frusto-triangular piece of flexible material which forms each barrier member 14 is such that the barrier members 14 are restrained by their side portions 16 so as to be downwardly inclined towards each other at a small angle (e.g. about 10° to 20°) to the horizontal when they are inflated by the gas cushion 3 to form a shallow V-shaped depression. Inclining the barrier members 14 inward provides a stabilizing effect, reducing any tendency of a body to move sideways off the apparatus. This arrangement also allows irregular-shaped bodies to be "centred" if dropped on to the apparatus. However, before pressurized air is admitted to the base 213, the barrier members 14 hang relatively limply, collapsed under their own weight, and they are urged to the shapes illustrated, by the cushion 3 of pressurized air which becomes "trapped" under the barrier members 14.

In the cross-sectional view of FIGURE 22, it will be seen that oppositely-facing barrier members 14 extend into contact with each other and very little, if any, cushion air can escape between them from the base structure 213.

As shown in FIGURE 23, when the body 2 is rested on the barrier members 14, the weight of the body depresses the members 14 and opens a gap 219 between them. Momentarily, adjacent parts 220 of the oppositely-facing barrier members 14 which are in contact with the body 2 follow the contour of the underside of the body. Cushion air then intrudes between the parts 220 and the body 2 as far as the extreme regions 221 of contact therebetween until the differential pressure across the parts 220 is substantially zero. The parts 220 of the barrier members 14 now sink into the cushion space under their weight, since there is now substantially no upwardly acting gas pressure to support them, i.e. no pressure differential, and, in falling, widen the gaps 219. The final positions of the parts 220, as shown in FIGURE 24, are determined largely by their weight and stiffness. The parts 222 of the barrier members 14 outside the extreme regions 221 of contact of the body 2 and the members 14 are still upwardly urged by cushion pressure and contact the body 2 at the extreme regions 221 to substantially close the top of the chamber 213. The body 2 thus bridges the gap 219 between the opposite barrier members 14 and replaces the parts 220 between the extreme regions 221 as the upper boundary of the cushion 3. The body 2 is supported by the air cushion 3 and is in light contact with the barrier members 14 only at the extreme regions 221. It will be seen that the parts of the side portions 16 which are substantially perpendicular to parts 220 of the barrier members 14 have wrinkled in the absence of tension, but that the parts of the side portions 16 substantially perpendicular to the parts 222 of the barrier members 14 are still under tension and so communicate the restraining force on parts 222 to the side walls 212.

In order to ensure that the adjacent parts 220 of the barrier members 14 sink into the space occupied by the cushion 3 when the body 2 is brought into contiguous relationship with the barrier members 14, and to reduce the possibility that they will flap up and down when the body 2 has bridged the gap 219 between barrier members 14, biasing means in the form of weights 225 can be attached to the concavities 15 of the barrier members 14 (only shown in FIGURE 24). Each barrier member 14 can carry more than one weight 225, the weights being disposed in spaced array along the concavity of the member. This arrangement gives rather better results than a single weight 225.

In the case where the body 2 is that of a badly burned hospital patient, it is preferred that when the patient is supported on the apparatus 210, substantially no contact occurs between the body and the barrier members 14, and that when the body has reached its equilibrium supported position on the apparatus, there is a gap between the burned part of the body and the barrier members which is sufficiently small (e.g. 1/16″) to restrict the escape of cushion air to a rate which avoids rippling the skin of the body. A gap of this order of width is satisfactory from the point of view of preventing hard contact between the body 2 and the barrier members 14 and from the point of view of limiting the escape of air through the gap to a value which will not cause the skin of a patient to ripple (which will be painful if the skin is burned or lacerated) and which will not necessitate a high rate of supply of air to the chamber 213 to compensate for air lost through the gap.

With a cushion pressure of between thirty and forty pounds per square foot, it has been found that a gap of the order of 1/16 inch can be obtained if each of the weights 225 is between two and three ounces.

It has been found that burned or lacerated tissue benefits from a flow of air over it and the small flow of air through the gap provides this benefit. These preferred conditions can be attained by increasing the mass of the weights 225.

The mass of the weights 225 can be determined experimentally so that only slight drop in differential pressure across the barrier members 14 occasioned by the presence of the body 2 while it is a fraction of an inch above the members 14, will cause the weighted parts of the members to sink towards the interior of the chamber 213.

With reference to FIGURE 25, the weights 225 may be disposed in pockets 211 formed in the concavities 15 thereof so that they can be removed or replaced by other weights when desired.

Instead of providing weights 225, the same or similar effect can be achieved by making a barrier member 14 with an inner part thereof heavier than the remainder. This can be done by making a barrier member in two parts, and gluing the two parts together.

FIGURE 26 shows barrier members 14 which are upwardly urged by the air cushion 3 whilst being biased towards the space within the base 213 by tension in resilient tie members in the form of a plurality extended elastic strips 228 which are glued or otherwise attached to the side portions 16 and extend perpendicular to the concavities 15 and in spaced array to the side walls 212 and bottom 227 of the base 213. The elastic strips 228 are chosen to have a length and resilience such that a very small drop in the upwardly acting differential pressure across those parts of the barrier members 14 beneath a downwardly presented body 2 will cause those parts to sink into the cushion space substantially without contact between the body and the parts in a manner somewhat similar to that described in relation to the embodiment of FIGURE 24.

FIGURE 27 shows a further modification of the apparatus 210 wherein the resilient tie members comprise tension springs. In this modification, the lowest edges of the side portions 16 of the barrier members 14 are attached to light-weight (aluminium) frame members 230 of inverted U form pivotally attached to the top edge of the sides 212 of the chamber 213 by pivot pins 231 so that the limbs of the U can swing towards and away from the bottom 227 of the base structure 213. Each frame member 230 carries a pair of hooks 232 (one on each limb) substantially midway along its length and on the side opposite the adjacent side wall 212. The hooks 232 engage the hooked ends of a lightweight tension spring 233, the other ends of which are secured to the adjacent side wall 212. When cushion air is initially supplied to the chamber 213, the barrier members 14 are upwardly urged to the positions shown in FIGURE 27, under the influence of the air cushion 3 formed within the base 213 and against the bias provided by the springs 233.

As seen in FIGURE 28, when the body 2 is downwardly presented to the barrier members 14, the differential pressure across the parts of the barrier members beneath the body 2 falls as the small quantity of air which inevitably escapes upwardly from the chamber 213 is trapped beneath the body. The upward forces supporting those barrier members 14 thus fall and, under the bias of the springs 233 (as well as their own weight), the members 14 sink downwardly to the new equilibrium position, shown, in which the bias of the springs 233 (now smaller than in FIGURE 27 because the springs are less extended) is balanced by the reduced mean differential pressure upwardly acting on the barrier members 14. The body 2 will not substantially touch the barrier members 14 but will be suspended above them a small distance (say, 1/16 of an inch) by the pressure of the air cushion 3 upwardly acting on the body through the gap 235 which is formed between oppositely-facing barrier members 233 as they sink downwardly. The tension in the side portions 16 set up by the upwardly acting differential pressure on the barrier members 14 and the downwardly acting bias of the springs 233, plus the weight of the springs 233 and members 14, will be reduced as the differential pressure across the parts 15a of the barrier members 14 beneath the body 2 falls. The tension in parts 16a of the side portions 16 may fall to substantially zero as shown in FIGURE 28, if the pressure differential across those parts falls correspondingly.

FIGURE 29 illustrates yet a further modification of the apparatus 210 and shows body-supporting apparatus which can be dismantled for ease of transportation. The base 213 of this modification is defined in part by a downwardly looped sheet 237 of thin, flexible material such as rubber, or rubberised fabric, the ends of which are closed by panels 238 of similar material which are either permanently stitched to the ends of the looped sheet 237 or removably attached thereto by suitable fasteners or press-studs (not shown). Each upper edge 239 of the looped sheet 237 is releasably clamped between a top plate 240 and a lower flanged plate 241 which are secured to each other by clamping bolts 242 which pass through eyelets provided in the upper edges 239. The flanged plates 241 are attached to the upper ends of upright-disposed side frame tubes 243, which also serve as legs for the apparatus 210, and opposite side frame tubes 243 are maintained in the desired relative positions by bottom frame tubes 244 to which they are rigidly clamped. The spacings of the bottom frame tubes 244 are maintained by spacing frame tubes 245 which extend horizontally between the side frame tubes 242. The frame tubes 243, 244, 245 form a rigid supporting framework which forms the remainder of the base structure 213.

On the underside of each side plate 240 are a plurality of spaced-apart metal webs 246 to which are pivoted, at pivots 231, frame members 230. The pivots 231 allow the frame members 230 to swing in respective vertical planes. Flexible barrier members 14 are attached, by their side portions 16, to the limbs of the frame members 230. On one face of each web 246 is a cylindrical projection 247 around which are wound the circular turns of a tension spring 248. One arm 249 of the tension spring 248 engages one of the hooks 232 on the adjacent frame member 230 and urges the member 230 downwards, and the other arm 250 is clamped between the two jaws 251 of a clamp 252 formed from slotted strips of spring metal. The clamp 252 is engaged, through ball-joints 253 on the bottom of adjusting screws 254 which are threadedly retained in the side plates 240. When the adjusting screws 254 are turned so that they move downwardly through the side plates 240, the clamp 252 is displaced downwardly without rotation (due to the provision of the ball-joint 253) and the downward force of the arms 249 of springs 248 on the frame members 230 is diminished. Thus, there is provision for adjusting the downward force on the barrier members 14. This is of advantage when, for instance, the body 2 to be supported is very heavy in relation to the area available for exposure to the air cushion 3 and the pressure of the air cushion must be raised to a high value. The differential pressure supporting the barrier members 14 will now be correspondingly raised, and the downward pull of the springs 248, the weight of the barrier members 14, and the frame members 230 will be insufficient to cause them to sink into the chamber 213 when the body 2 is downwardly presented to the barrier members 14, trapping air between the body 2 and the members 14. In this instance, the adjusting screws 254 are turned so that they move upwards, pulling, through the ball-joints 253, the upper jaws 251 and the arms 250 of the springs 248 upwardly. The downward force produced by the arms 249 will be increased and will eventually be sufficiently great to pull the frame members 230 downwardly when a body 2 is presented to the barrier members 14.

Although not shown in FIGURES 27 to 29, the barrier members 14 of those figures may be provided with weights as described, for example, in relation to FIGURE 24, so that the members 14 sink towards the interior of the chamber 213 when the differential pressure across the barrier members 14 falls very slightly. Alternatively or in addition, the barrier members 14 may be constrained by elastic strips as described in relation to FIGURE 26 but extending from the frame members 230, instead of from the concavities 15.

A virtue of the apparatus of FIGURE 29 is its simplicity which renders it relatively cheap to make, easy to dismantle (e.g. for cleaning) and light in weight. It is thus well suited for emergency use, and is particularly useful as a field stretcher.

FIGURE 30 shows an apparatus 210 similar to that shown in FIGURE 20, in which the side walls 212 incorporate windows 255 so that the surface of those parts of the body 2 exposed to the air cushion 3 can be inspected. Windows 255 may also be incorporated in the bottom 227 of the base 213 and suitable illuminating means (not shown) may be installed within the base.

FIGURE 31 is a cross-sectional view through the apparatus 210 of FIGURE 30 with the barrier members 14 being omitted for clarity. It will be seen that the air inlet connection 214 communicates with a distribution chamber 256 formed between the bottom 227 of the base 213 and a perforated partition 257. The perforations in the partition 257 ensure that air forming the cushion 3 will be uniformly distributed within the base 213.

In FIGURES 32 and 33, a modified apparatus 210 is shown in which the air inlet connection 214 communicates with an air receiving chamber 258 at one end of the base 213 and which is defined by said end and a vertical (imperforate) partition 259 spaced therefrom. The chamber 258 communicates with air distribution channels 260 defined by outwardly extending upper portions of the side walls 212 and vertical partitions 261 spaced inwardly therefrom. The partitions 261 have rows of perforations 262 so that air enters the base 213 immediately beneath the barrier members 14.

In the embodiments of, for example, FIGURES 20 to 24, oppositely-facing barrier members 14 all extend substantially into contact with each other before the body 2 is superimposed on them. If the body 2 is relatively wide, the parts of the members 14 which subsequently fall towards the interior of the base 213 will be correspondingly large and will tend to obscure the view of the underside of the body 2 provided by the windows 255. FIGURE 34 shows, in cross-section, a modification wherein oppositely-facing barrier members 14 define a considerable gap 216 before the imposition of the body. As shown in the figure the imposition of the body 2 will not cause the view through a side window 255 to be impaired by the limp parts of the barrier members 14.

With reference to FIGURE 35, a somewhat shallower base structure can be obtained, whilst still retaining a substantially 90° angle between a concavity 15 and the inner edges of the associated side portions 16, by "rotating" the barrier member 14, about the upper ends of the concavities 15. The barrier members need now to be attached to the base 213 at two points, namely the upper and lower ends of their side portions 16. These points are indicated by reference numerals 275 and 276 respectively.

Unfortunately however, this modification presents a problem when the body 2 is that of a female as, if downwardly facing, the breasts of the female can encounter the inner edges 277 of the side portions 16 of the barrier members 14. (See dotted outline of body 2.) Along these edges the material of the side portions is in tension, and apart from any slight stretching of the material, the effect is if taut ropes extended along the edges 277. If the breasts are burned or lacerated, this will cause pain to the female patient and impair any healing.

This discomfort can be reduced, or even eliminated, by moving the tensioned edges 277 away from the body 2, and with reference now to FIGURE 36, this can be done by making the bottom attachment point 276 movable, relative to the base 213.

Referring to FIGURE 36, pairs of barrier member coupling hooks 278, 279 and 280 are disposed on the bottom 227 of the base structure 213, equi-spaced on either side of an imaginary line passing vertically through the centre of the base, and on arced paths, the centres of which coincide with the upper attachment points 275. When the bottoms of the barrier members 14 are attached to the base bottom 227 by the hooks 278 their orientation is as shown in the dotted lines, i.e. the same as that shown in full lines in FIGURE 35.

If however, before the female body 2 is downwardly presented to the barrier members 14, the barrier members 14 are uncoupled from the hooks 278 and then coupled either to the hooks 279 or, as actually shown, to the hooks 280, then the barrier members can be "rotated" about attachment points 275 so that the breasts of the female are not brought into contact with the tensioned edges 277. Although not shown in the figure, the hooks 278, 279, and 280 are spring loaded to ensure that regardless of position, the side portions 16 of the barrier members 14 are maintained taut.

With reference to FIGURE 36A the arrangement of FIGURE 36 can be modified by providing the barrier members 14 with side portions 16a of pentagonal instead of triangular shape and providing three equi-spaced attachment points 276a (eyelets) on the lower edge thereof. The points 276a are disposed on an arc the centre of which coincides with the upper attachment point 275 and any one of the points can engage with a single spring-loaded attachment hook 278a attached to the bottom 227 of the base 213.

The modifications of FIGURES 36 and 36A do, however, suffer from the drawback that the adjustment of the position of the tensioned edges 277 cannot take place whilst the patient is supported on the apparatus 210, so that, for instance, if a patient lying face upwards is to turn over, he, or more likely she, will have to be taken off the apparatus while the necessary adjustment is made.

FIGURES 37 and 38 shows a further modification of the apparatus 210, in which the angle of inclination to the horizontal of the tensioned edges 277, can be altered without removing a body 2 from the apparatus.

Beneath each side portion 16 of a barrier 14 is a rail 281 which is attached to the adjacent side wall 212 and which is arcuate about the top attachment point 275 of the barrier members, and which has a groove 282 formed in its upper surface. The groove 282 defines an arced path the centre of which coincides with the upper attachment point 275. As shown in FIGURE 38, the groove 282 is "pinched" at the upper surface so that a slide 283 of a low friction material, such as polytetrafluoroethylene, is slidably retained in the groove. A tension spring 284 extends between the slide 283 and a fastening 285 holding the bottom corners of the side portions 16 together, and the tension of the spring maintains the slide in contact with the pinched portion of the groove 282. The side walls 212 of the base 213 have apertures 286 which register with the grooves 282 and control rods 287 attached to the outer ends of slides 283 extends outwardly of the side walls 212 through the apertures 286. The control rods 287 are air-sealed to the side walls 212 by glands 288. Thus, by pulling the rods 287 outwardly away from the base 213, the tensioned edges 277 of the barrier members 14 are downwardly swung about their upper attachment points 275. (As seen in dotted lines in the left hand side of FIGURE 37.) The upwardly acting forces of the air cushion 3 urge the barrier members 14 upwardly, and to restrain the members 14, the control rods 287 are releasably secured by locking screws incorporated in the glands 288.

FIGURE 39 shows yet a further modification of the apparatus 210. In this modification, horizontally-disposed tie cords 290 extend from attachment points 291 on the concavities 15 of the barrier members 14, and through the side walls 212 to outside the base structure 213. Air seals 292 provide a seal between the cords 290 and the side walls 212. By drawing in or paying out the tie cords 290 a part of the barrier member can be deflected individually as indicated in the full and dotted lines on the left hand side of the figure. The cords 290 can be delayed by knotting them as indicated in FIGURE 6. The modification allows local retraction of a wall member 14 away from a part of the body 2. The body part may, for example be extremely tender and contact by a wall member, cannot therefore, be tolerated, however light. Retraction of a wall member 14 by pulling on its tie cord 280 can also accommodate the variation in profile of the body 2 or can be employed to allow a healing flow of air to pass over a burned or similarly damaged part of the body.

As shown in FIGURE 40, instead of knotting the tie cords 290, the cords can be passed over external pulleys 294 and weights 295 attached to the tie cords. The pull load of a barrier member 14 will vary, of course, according to the mass of the weight 295.

In a further modification of both FIGURES 39 and 40 a barrier member 14 may be provided with several tie cords 290 attached to spaced-apart portions of a concavity 15.

In the modification of FIGURE 41, the apparatus 210 (or similarly the apparatus 1 of FIGURE 1) is made in two sections, the left hand (or body) section 302 being hinged to the right hand (or leg) section 307 at 297. The apparatus 210 is supported clear of the ground by supports 298 and 299. The support 298 comprises a hydraulic jack pivotally attached to the suction 302 and to the ground beneath. The jack support 298 is under the control of an operator, through hydraulic signal lines 300. The sections 302, 303 are air sealed to each other by flexible membranes 301, one on each side of the apparatus. Extensions of the jack support 298 pivots the section 302 upwardly, relative to the section 303 as shown.

The modification allows the body 2 to be placed in a near sitting position, in order, for example, to make the body more comfortable. Alternatively, the supports 298, 299 can be reversed so that the legs of the body 2 can be raised relative to the remainder of the body.

In a modification of this arrangement, the base 213 can be made of flexible material, as in FIGURE 29. To allow relative movements of the two parts of the base structure, the base support will have to be suitably adapted. With reference to FIGURE 29, this can be done by making the tube support 45 of two part construction, pin-joined together.

In a modification of the apparatus 210 of FIGURES 20 and 21, the flexible barrier members 14 on each side of the base 213 can be made from a single piece of flexible sheet-like material.

With reference to FIGURES 42 and 43, a row of circular-section rods 326 extend downwardly from blind bores (not shown) in the side walls 212 near the base 227 of the base 213, substantially in the vertical planes between the shaped blocks 216, where they are located in apertures in a keel-like support 328. An elongated strip 311 of thin, flexible sheet material is wound over the shaped blocks 116 and under the rods 326 seriatim to form a row of barrier members 14 which cooperate between the blocks 116 so that pressurized air from base 213 cannot escape between them. The strip 311 can be maintained in position by the provision of spikes (not shown) projecting from the rods 326 if this is felt to be necessary. In most cases, however friction between the strip 311 and the rods 326 will suffice in this respect. The row of barrier members 14 associated with the opposite side wall 212 of the apparatus 210 is similarly formed, and the adjacent free edges of the barrier members 14 in each row co-operate to substantially seal the base 213 under the action of the cushion 3.

In order to facilitate winding of strip 311 over the shaped blocks 116 and under the rods 326, the support 328 may have a detachable upper portion 329, as shown in FIGURE 44, which is attached to the fixed lower portion 330 by means of swing-mounted hooks 331 which engage pins 332 on the lower portions 330. The strip 311 is wound over the blocks 116 and loops of material are left hanging between adjacent blocks 116. The rods 328 are inserted into these loops, and then clamped with one of their ends between the upper and lower portions 329, 330 of the support 328 and with the other of their ends in blind bores (not shown) in the side walls 212, so as to draw the strip 111 fairly taut. Oppositely-facing barrier members 14 cooperate with each other substantially vertically above the support 328.

FIGURES 45 and 46 show yet a further modification of the apparatus 210. The upper section X of barrier member 14, as viewed in FIGURE 45, is formed in the manner of any of the above described arrangements, while the lower section Y comprises, in effect, two sections, each resembling the upper section X, placed side-by-side and having a central "side" wall 312 in common. All the barrier members 14 extend across the top of the base 213 to provide a substantially unbroken surface. The surface defines a shallow V-shaped depression at section X and a flattened W-shaped depression at sections Y and Z. As will be seen from FIGURE 46, the upper section X is used for supporting the shoulders of the body 2, while each of the sections of the lower section Y is used for supporting the lower portions of the legs. The central section Z supports the body torso and is arranged so that the gaps which open up between the barrier members 14 in the upper section X and the lower sections Y of the apparatus 210, when a torso and limbs are being supported, all join one another beneath the central lumbar region of the body. This ensures that as much as possible of the body is supported on the air cushion 3 without contacting any substantial area of the barrier members 14 or any hard structure, such as the centre wall 312. The flexible barrier members 14 attached to the central wall 312 at its extremity in central section Z, extend substantially radially outwardly from the extremity. Their free edges are more or less at right angles to the direction in which they extend and the barrier members 14 extending from the opposite side walls 212 are adapted so that their free edges co-operate with the free edges of the barrier members 14 attached to the central wall 112, to form substantially a seal between them. For ease of assembly, section X may be detachably attached to section Z. All the barrier members 14 incline inwardly towards the cushion space beneath, the members of section X inclining at about 10° to 20° to the horizontal, whereas the members of sections Y and Z incline at about 45°.

FIGURE 46 shows the apparatus 210 of FIGURE 45 in use, and as has been described in relation to the previous embodiments, the parts 320 of the flexible barrier members 14 which lie between the extreme region 321 of contact between the body 2 and the members 14 become subject to substantially a zero differential air pressure and sink towards the interior of the base 213 under their weight, aided, if desired, by the provision of weights resembling the weights 225 of FIGURE 24. Very little cushion air manages to escape between the extreme region 321 and the torso and legs of the patient which are thus comfortably supported on the pressurized air cushion 3 acting through the gap between the barrier members 14. In the case where the torso and legs are burned or lacerated, supporting by pressurized air makes for more comfort than does supporting by means of a conventional mattress with the attendant necessity for dressings over the wounds. The air supplied to the base 213 can be warmed, dried and suitably treated with medicaments to enhance the healing process. As the air losses from the base 213 will be relatively small, the air supply compressor can be small, and any heating or other treatment of the air will be relatively cheap.

The apparatus 210 of FIGURES 45 and 46 is suitable for supporting patients of most sizes and shapes so long as the maximum length and width between the side walls 212 is not exceeded. To reduce cushion air leakages, it is necessary that the buttocks or the lower lumbar region of the body 2 is maintained in contiguous relationship with the barrier members 14 in section Z which are attached to the central wall 312 in order to form an air seal therewith. In order that the patients may be maintained in this position, the "head" end X of the apparatus 210 is arranged to be slightly higher than the "feet" end Y, so that patients will always tend to move to a position in which the crotch lies adjacent the upper end of the central wall 312.

As the legs and buttocks of a body differ in surface density, it is preferred, if possible, to support these parts at differing pressures. With reference to FIGURE 47, this may be done by the provision of internal flexible partitions 337 which depend from the underside of the barrier members 14 to define a small gap 338 with the bottom 227 of the base 213 and divide the central section Z of the base 213 from the other sections X and Y. Pressurized air is supplied by way of the inlet 114 to the central section Z of the apparatus to support the buttocks, and then passes through the gaps 338 to reach sections X and Y at lower pressures to support the body parts, shoulders and lower portions of the legs, and a higher pressure beneath the torso. The gaps 338 between the internal partitions 337 and the bottom 227 of the base 213 throttle the passage of air to the sections X and Y so that it reaches these sections at the required lower pressures. To prevent escape of cushion air from the centre section to those on each side thereof, seals (not shown) are provided on the upper edges of the partitions 337, to cooperate with the body.

The body-supporting apparatus of the invention is cheap to make and operate. It is also very simple in construction and light in weight, and parts, such as the flexible barrier members 14, can be easily removed for cleaning. The apparatus also has military and civil defense applications, for example, to provide relief for a body suffering from nuclear-radiation burns. Alternatively, or in addition, the apparatus can be installed in vehicles such as ambulances, to provide a comfortable support during movement of the vehicle over rough or irregular surfaces.

The apparatus may also be used as a conveyor, particularly for fragile or irregularly shaped goods when it extends between a loading and unloading station. As the goods (not shown) move along the apparatus, they are supported on the cushion 3 through the gap which forms between the oppositely extending barrier members 14 with which they are in contact, the gap closing as the goods break contact with the oppositely extending barrier members 14. The goods may be caused to move under their weight, for example, by sloping the apparatus 10, or they may be pushed, pulled, or self-propelled. The effort necessary to move the goods will be less than that required to move them over a comparable conveyor employing rollers to support them.

With reference to FIGURES 48 and 49 the apparatus 210 is shown installed in an ambulance 340, air for the cushion 3 being supplied by a fan 340 driven by a 5 H.P. electric motor 341 powered from the vehicle's dynamo.

The fan and motor unit 340, 341 are disposed within a duct 342 housed in a box-like casing 343 of the same length and breadth as the apparatus 210 and secured to the floor 346 of the ambulance. As shown, the base 213 sits on top of the casing 343 and releasable fastenings 345 demountably secure the bottom 227 of the base 213 to the casing 343.

The inlet and outlet ends of the duct 342 are provided with fine and coarse air filters 347 and 348 respectively and a heat exchanger 349 is disposed at the downstream end of the fan 340. The bottom 227 of the base 213 is apertured to allow free passage of air from the fan 340. The coarse filter 348 is connected to atmosphere by way of a duct (not shown), the inlet of the duct being disposed well above the level of the floor 346 so as not to take in too much dust from the atmosphere. Alternatively, the inlet of the duct can be open to the interior of the ambulance so that the air contained therein can be recirculated. This arrangement reduces heat losses. The heat exchanger 349 comprises a close-coiled section of small bore pipe 350 through which hot water is circulated by a pump 351. Control and isolating valves 352 are provided at the upstream and downstream ends of the heat exchanger 349. The circulating water can be heated by heat extracted from the prime mover of the ambulance 340, or, as shown, it can be heated in passage through a heat exchanger 353 comprising an insulated casing 354 housing a gas-fired burner 355 fed with gas (for example, propane) from a valved container 356.

FIGURES 50 to 52 show a further modification of the body-supporting apparatus 210 suitable for use in the ambulance 340.

With reference to FIGURES 50 and 51, the sides 212 of this modification are formed by a single sheet 370 of thin, flexible material folded to give an M-like vertical cross-section. Starting from one longitudinal edge of the bottom 227 of the base 213, the sheet 370 extends vertically at first to form one side wall 212 then passes over a top support tube 371 then downward to pass under a bottom support tube 373. From beneath the tube 373 the sheet 370 extends upwardly towards another tube 371 and then, finally, downwardly to the other longitudinal edge of the bottom 227 to form the other side wall 212. The tubes 371 and 373 are disposed lengthwise along the apparatus 210 in parallel array. The tube 373 is disposed in a plane central of the planes in which the tubes 371 are disposed.

The tubes 371 and 373 are end-located by brackets 379 (FIGURE 51) attached to the inner surfaces of metal end plates 374 (FIGURE 50) and the edges of the sheet 370 forming the side wall 212 are demountably secured to the casing 343 by releasble fastenings 345.

With reference to FIGURE 51, the rows of barrier members 14 are stitched to each inner, inclined portion 375 of the sheet 370 and the members are inflated by cushion air entering their concavities 15 through apertures 376 formed in the portions 375.

With reference now to FIGURE 52, the legs of the body 2 are divided by an inflatable centre wall structure 380 of bag-like form, the lower part of which is penetrated by the bottom tube 373. The tube 373 is air-sealed to the ends of the wall structure 380 by annular seals 381. Barrier members 14 are stitched to the sides and one end of the wall structure 380. The portion of the tube 373 between the ends of the wall structure 380 is perforated by holes 382.

In operation the modified apparatus 210 can, together with the end plates 374, be used as a stretcher in order to carry an injured person to the ambulance 340. Under these conditions, as no cushion 3 is present, the body 2 is supported on the apparatus by removable cross-supports (not shown). On entering the ambulance 340, the apparatus 210 is lowered on to the casing 343 and connected thereto by the fastenings 345. Air is now supplied to the casing 212 to form the air cushion 3 and is also supplied (at about twice cushion pressure) through a connection 383 and flexible supply duct 384 to one end of the tube 373 so as to inflate the wall structure 380. The other end of the tube 373 is plugged to prevent outleakage of inflation air. As soon as the body 2 is supported by the air cushion, the cross-supports are withdrawn from the apparatus.

FIGURE 53 shows yet a further modification of the apparatus 210, and in this modification the bottom 227 of the base 213 is perforated by a pair of apertures 390 enabling pressurized air to escape downwardly from the base 213. Peripherally disposed around the bottom 227 is a ring of flexible wall members 391 which are similar to the barrier members 14. Each wall member 391 is formed from a piece of substantially frusto-triangular thin, flexible material which has been folded to a U-shape and attached to the periphery of the bottom 227 with the concavity of the wall member downwardly inclined towards the wall members 391 attached to the opposite side of the bottom 227. The air downwardly escaping from apertures 390 forms a supporting cushion of air beneath the bottom 227, the cushion being contained by the wall members 391. The apparatus 210 can be moved over a surface smoothly (using pull ropes 392 attached to one end of the base 212) with comparatively little effort, the wall members 391 deflecting relative to each other to accommodate surface irregularities. Although not illustrated, it is contemplated that the bottom 227 may be omitted so that the body-supporting and apparatus-supporting cushions are common.

FIGURE 54 shows the apparatus 1 (or, similarly, the apparatus 210) installed in a hospital or similar building.

Air is drawn in from the atmosphere through an intake 403 by a pump 400 through first and second stage filters 401, 402, respectively, is heated and sterilized in passage through a heater 103 and is then discharged in a pressurized condition to the apparatus by way of the duct 6. Air escaping from the apparatus can, if desired, be collected in an outer chamber 404 and returned to the system by way of a duct 405. Collection and return to the system of the air is particularly advantageous if the air has, for medical purposes, been enriched with oxygen. Oxygen can be introduced into the system through a valved source 406 connected to the system by way of a duct 407.

To avoid subjecting a patient to acute discomfort caused by the temperature of the cushion air rising rapidly when the body 2 is lowered from a position where a relatively large air flow is passing through the heat 403 to the body's "final" position when little air passes through the heater, a dump valve 408 under the automatic control of a controller 409 sensitive to cushion temperature is fitted so as to "dump" any excess cushion air until proper adjustment can be made. If required, the dump line can be connected to a reservoir 410 which is in turn connected, through a line 411 fitted with a control valve 412, to the inlet of the pump 400. The air dumped can thus be returned to the system, with less heat loss than would otherwise result.

To provide the best possible filtering of the air before it is supplied to the apparatus, the filter 402 could be transferred to the outlet side of the pump 400.

It is to be understood that many of the modifications described above can be combined. For example, those body-supporting apparatus which have not been specially described as having base structures at least parts of which (the side walls for example) are constructed from flexible, sheet material, can be so constructed. Similarly, an apparatus can be provided with both the weights 225 of FIGURE 25 and the barrier member position-adjusting feature of FIGURE 36. If a patient is to be supported while lying face downwards, to allow him to breathe properly, a concave member can be provided, carried on cross-supports which rest on top of a base structure, into which the patient places his face. The member keeps the barrier members away from the patient's face, allowing him to breathe. When a patient is lying face upwards, similar apparatus can be provided, but serving on this occasion as a bed-pan.

With reference now to FIGURES 55 to 57, the invention has application as a conveyor 441 in supporting a heavy body such as a crate 440, in transit between two points.

The conveyor 441 comprises a base structure 442 of elongated form, the width of which is slightly smaller than that of the crate 440. A pair of guide strips 551 equi-spaced from the sides of the base 442 constrain the crate 440 to movement along the longitudinal axis of the base 442. Two parallel disposed rows of flexible barrier members 14 extend along the sides of the base 442 and rows of laterally-disposed barrier members 14 define, with the barrier members 14 at the sides of the base, and with the base itself, a plurality of discrete spaces 443. The length of a space 443 is a little under half the length of the crate 440. The barrier members 14 in each laterally-disposed row are arranged alternatively in the manner described and illustrated in copending application Ser. No. 434,003, filed Feb. 19, 1965.

Pressurized air is supplied to each space 443 by a supply line 445 provided with a control valve 446. To economize on air, the valves 446 are normally closed and are opened when required, by electrically operated valve controllers 447. The controllers 447 operate in sequence through electrical signals indicated by photo-electric cells 448 connected thereto. The cells 448 direct their light beams across the base 442 at stations spaced from the valves 446.

In operation, load handling means in the form of a towing carriage movable on a track above the crate 440 is used to move the crate 440 at a predetermined speed in the direction of the arrow 449 and, in so doing, interrupts the light beams of the photo-cells 448. The valves 446 are thus opened in sequence so that the barrier members 14 of space 443 are inflated by trapped air as the crate 440 moves over said barriers and remain inflated until the crate 440 has passed over said space and the light beams of the associated photo-cell 448 is restored and the valve 446 closed. Air trapped in a space 443 creates a crate-supporting cushion of air 450. The crate 440 is actually supported by an adjacent pair of cushions 450 and opening and closing of the valves 446 is timed accordingly.

With reference to FIGURE 57, as one space 443 is filled with air, the inwardly facing barrier members 14 inflate to squeeze the side portions 16 of the outwardly facing members together, and form, with those side portions, an air-tight seal. In effect a pair of cushions 450 "move-along" with the crate 440, the relative positions of the inwardly and outwardly facing barrier members 14 of the associated spaces 443 changing over as the crate moves along.

Although in the examples described above only air has been used to form a body-supporting cushion it will be appreciated that, where conditions allow or dictate, gases other than air can be used.

I claim:
1. Apparatus for supporting at least part of a body on a gaseous cushion comprising a base structure, flexible barrier means attached to the base structure, the barrier means being constructed from flexible sheet material and being inflatable so as to form two relatively movable rows facing each other across the top of the base structure and to cooperate with the base structure and the body part when the body part is brought into a contiguous relationship with the barrier means and define with the body part and the base structure a cushion space, and means for supplying pressurized gas to the cushion space so as to form therein a cushion of pressurized gas to provide support to the body part.

2. Apparatus for supporting at least part of a body on a gaseous cushion comprising a base structure, flexible barrier means attached to the base structure, the barrier means being constructed from flexible sheet material and being inflatable so as to cooperate with the base structure and the body part when the body part is brought into a contiguous relationship with the barrier means and define with the body part and the base structure a cushion space, and means for supplying pressurized gas to the cushion space so as to form therein a cushion of pressurized gas to provide support to the body part, said barrier means comprising rows of separate barrier members, each defining a concavity, the hollow of which is presented towards the cushion space, a side portion of each barrier member being contiguous with the adjacent side portion of a neighbouring barrier member, and serving as tie means for constraining the barrier member against deflection away from the cushion space by the pressure of gas therein, whereby, in operation, pressurised gas supplied to the cushion space passes into the interiors of the barrier members to inflate them, and, in so doing, urges the contiguous side portions of neighbouring barrier members towards each other.

3. Apparatus as claimed in claim 2 wherein said barrier members are disposed in two rows facing each other across the top of the base structure.

4. Apparatus as claimed in claim 2 wherein the base structure is of substantially flat form and the flexible barrier members are so distributed over the base structure that the cushion space has a profile related to the profile of the body part, and are so arranged that, when inflated, they tend to project upwardly from the base structure.

5. Apparatus as claimed in claim 4 wherein the barrier members are disposed in substantially parallel rows so that at least two cushion spaces are defined, superimposed one on another, one space being of larger area than the other.

6. Apparatus as claimed in claim 1 including means for adjusting the position of the flexible barrier means relative to the base structure so as to conform to the profile of the body part being supported.

7. Apparatus as claimed in claim 6 wherein the barrier adjusting means comprise a barrier means support structure slidably mounted relative to the base structure so as to move the barrier means in a sideways direction said support structure including first and second parts adjustably movable relative to each other so as to move the barrier means in a substantially vertical direction.

8. Apparatus as claimed in claim 6 including extensions of flexible, sheet material for attaching the barrier means to the base structure, said extensions being inflatable to conform to a desired shape, and wherein the means for adjusting the position of the barrier means comprise means for varying the cross-sectional profile of the extensions.

9. Apparatus as claimed in claim 8 wherein the extensions comprise membranes folded to assume profiles of loop form and inflated by gas present in the cushion space, and including tie means for constraining the membranes against cushion pressure, and means for varying the effective length of the tie means and thereby adjusting the positions of the barrier means.

10. Apparatus as claimed in claim 6 wherein the barrier means comprise barrier members disposed in two rows facing each other across the top of the base structure and including flexible membranes folded to assume profiles of loop form for attaching the barrier members to the base structure, said barrier members being inflated by gas present in the cushion space, tie means constraining the membranes against deflection away from the cushion space, and means for varying the effective lengths of the tie means, the effective lengths of the tie means associated with each row of barrier members being adjustable simultaneously whereby the positions of the barrier members of each row are adjusted symmetrically.

11. Apparatus as claimed in claim 6 including flexible extensions of closed shape, for attaching the barrier means to the base structure; a source of gas other than the cushion space for inflating the barrier means, and wherein the means for adjusting the position of the barrier means comprise means tending to compress the extensions in a controlled manner.

12. Apparatus as claimed in claim 1 wherein the barrier means comprise at least one membrane attached to the base structure and folded to assume a profile of loop form, the membrane being inflated by gas present in the cushion space.

13. Apparatus as claimed in claim 2 wherein the flexible barrier members are attached to the base structure at upper and lower ends of the side portions thereof and including means for moving the lower attachment points of the barrier members relative to the base structure.

14. Apparatus as claimed in claim 13 wherein the means for moving the lower attachment point of each barrier member comprises a plurality of barrier attachment means attached to the base structure along an arcuate path the centre of which coincides with the upper attachment point of the barrier member.

15. Apparatus as claimed in claim 13 wherein the means for moving the lower attachment point of each barrier member comprises a slide member attached to at least one side portion of the barrier member and constrained to move in an arcuate path, the centre of which path coincides with the upper attachment point of the barrier member.

16. Apparatus as claimed in claim 2 including tie means attached to at least one barrier member whereby application of a pull load in an outward direction moves at least part of the barrier member away from the body part.

17. Apparatus as claimed in claim 16 including weight means for applying the pull load.

18. Apparatus as claimed in claim 1 wherein the base structure is of multi-part construction, one part being movable relative to another, and including means for controllably moving said one part relative to the other.

19. Apparatus as claimed in claim 1 wherein at least the sides of the base structure are constructed of flexible, sheet material.

20. Apparatus as claimed in claim 1 including means for forming and containing a cushion of pressurized gas beneath the base structure whereby the apparatus is supported above a surface by said last-named cushion.

21. Apparatus as claimed in claim 20 wherein the apparatus-supporting cushion and the body-part supporting cushion are common.

22. Apparatus as claimed in claim 1 including means for heating the gas supplied to the cushion space.

23. Apparatus as claimed in claim 1 adapted for installation in a vehicle for travelling over a surface.

24. Apparatus as claimed in claim 2 including means for biasing the barrier members towards the cushion space in opposition to upward forces exerted by said cushion, so that, when the body part is brought into contiguous relationship with the barrier members, whereby the normal pressure differential across said barrier members is substantially reduced, adjacent parts of the barrier members sink into the cushion space.

25. Apparatus as claimed in claim 24 wherein said biasing means comprise resilient tie members.

26. Apparatus as claimed in claim 24 wherein said biasing means comprise tension springs.

27. Apparatus for supporting at least part of a body on a gaseous cushion comprising a base structure, flexible barrier means attached to the upper portion of the base structure, the barrier means being constructed from flexible sheet material and being inflatable so as to cooperate with the base structure and the body part when the body part is brought into a contiguous relationship with the barrier means and define with the body part and the base structure a cushion space, and means for supplying pressurized gas to the cushion space so as to form therein a cushion of pressurized gas to provide support to the body part, said barrier means including at least two rows of separately formed barrier members facing each other across the top of the base structure, each of said barrier members having a substantially U-shaped lateral cross-section with a concave portion the hollow of which is presented towards the cushion space and a pair of side portions extending inwardly from the concave portion towards the cushion space, a side portion of each barrier member being contiguous with the adjacent side portion of a neighbouring barrier member whereby, in operation, pressurized gas supplied to the cushion space inflates the barrier members and urges their contiguous side portions together to form a gas seal therebetween.

28. Apparatus as claimed in claim 27 including means for opposing upward deflection of said barrier members by the pressure of the gas in said cushion space.

29. Apparatus as claimed in claim 27 including means for adjusting the positions of said barrier members relative to the base structure so as to accommodate variations in size and profile of the body part.

30. Apparatus as claimed in claim 27 including means for biasing the barrier members towards the cushion space in opposition to upward forces exerted by the pressure of the gas in said space, so that, when the body part is brought into contiguous relationship with the barrier members, whereby the normal pressure differential across said barrier members is substantially reduced, parts of the barrier members sink into the cushion space.

References Cited

UNITED STATES PATENTS

| | | | |
|---|---|---|---|
| 2,493,067 | 1/1950 | Goldsmith | 5—347 |
| 2,982,341 | 5/1961 | Besser | 297—57 X |
| 3,087,602 | 4/1963 | Hinkle | 198—220 |
| 3,108,293 | 10/1963 | King | 5—348 |
| 3,148,391 | 9/1964 | Whitney | 128—33 X |
| 3,235,099 | 2/1966 | Watters | 302—29 X |
| 3,266,848 | 8/1966 | Pitkanen | 302—29 |

FOREIGN PATENTS 932,779    7/1963    Great Britain.

CASMIR A. NUNBERG, *Primary Examiner.*